(12) United States Patent
Vilenskiy et al.

(10) Patent No.: US 10,921,654 B2
(45) Date of Patent: Feb. 16, 2021

(54) LIQUID CRYSTAL-BASED HIGH-FREQUENCY DEVICE AND HIGH-FREQUENCY SWITCH

(71) Applicant: Samsung Electronics Co., Ltd, Suwon-si (KR)

(72) Inventors: Artem Rudolfovitch Vilenskiy, Moscow (RU); Elena Aleksandrovna Shepeleva, Kostroma (RU); Gennadiy Aleksandrovich Evtyushkin, Moscow (RU); Mikhail Nikolaevich Makurin, Arkhangelsk (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 15/793,885

(22) Filed: Oct. 25, 2017

(65) Prior Publication Data
US 2018/0217456 A1    Aug. 2, 2018

(30) Foreign Application Priority Data

Jan. 31, 2017 (RU) ............................... 2017103134
Aug. 29, 2017 (KR) ........................ 10-2017-0109314

(51) Int. Cl.
*H01P 1/18*        (2006.01)
*G02F 1/1343*      (2006.01)
(Continued)

(52) U.S. Cl.
CPC .. *G02F 1/134363* (2013.01); *G02F 1/133345* (2013.01); *G02F 1/134309* (2013.01);
(Continued)

(58) Field of Classification Search
CPC ...... H01P 1/10; H01P 1/15; H01P 1/18; H01P 1/184; H01P 3/08; H01P 9/00
(Continued)

(56) References Cited

U.S. PATENT DOCUMENTS 5,936,484 A   8/1999   Dolti et al.
6,927,647 B2  8/2005   Starri et al.
(Continued)

FOREIGN PATENT DOCUMENTS

CN    1507671 A    6/2004
CN    102356510 A  2/2012
(Continued)

OTHER PUBLICATIONS

International Search Report dated Jan. 24, 2018 in connection with International Patent Application No. PCT/KR2017/011482.
(Continued)

*Primary Examiner* — Dean O Takaoka

(57) ABSTRACT

A high-frequency device and/or a high-frequency switch including the same may include: a signal electrode; a first ground electrode arranged in parallel with the signal electrode; a first liquid crystal layer disposed between the signal electrode and the first ground electrode; and a first dielectric layer disposed between the first liquid crystal layer and the first ground electrode, and/or between the signal electrode and the first liquid crystal layer. The first dielectric layer may have a dielectric constant that is larger than the dielectric constant of the first liquid crystal layer. The high-frequency device and/or the high-frequency device including the same may be variously implemented.

20 Claims, 12 Drawing Sheets

(51) Int. Cl.
*H04B 1/48* (2006.01)
*H04B 1/00* (2006.01)
*G02F 1/1333* (2006.01)
*H01P 3/08* (2006.01)
*H01P 9/00* (2006.01)
*H01P 1/15* (2006.01)

(52) U.S. Cl.
CPC ............... *H04B 1/006* (2013.01); *H04B 1/48* (2013.01); *G02F 2001/134318* (2013.01); *H01P 1/15* (2013.01)

(58) Field of Classification Search
USPC .................................................. 333/156, 161
See application file for complete search history.

(56) References Cited

U.S. PATENT DOCUMENTS

| | | | |
|---|---|---|---|
| 7,561,006 B2 * | 7/2009 | Dutta | .................. H01L 23/66 333/156 |
| 7,969,359 B2 | 6/2011 | Krishnaswamy et al. | |
| 8,476,804 B2 | 7/2013 | Hishinuma | |
| 9,059,496 B2 | 6/2015 | Glushchenko et al. | |
| 2001/0017577 A1 | 8/2001 | Toko et al. | |
| 2004/0155734 A1 | 8/2004 | Kosemura et al. | |
| 2005/0237137 A1 | 10/2005 | Dutta | |
| 2007/0164905 A1 | 7/2007 | Lempkowski et al. | |
| 2009/0073332 A1 | 3/2009 | Irie | |
| 2009/0174499 A1 | 7/2009 | Hiramatsu et al. | |
| 2012/0242394 A1 | 9/2012 | Murase et al. | |
| 2014/0022029 A1 | 1/2014 | Glushchenko et al. | |
| 2015/0380789 A1 * | 12/2015 | Jakoby | ................... H01P 1/181 343/905 |
| 2016/0241217 A1 | 8/2016 | Sazegar et al. | |

FOREIGN PATENT DOCUMENTS

| | | |
|---|---|---|
| CN | 105308789 A | 2/2016 |
| EP | 2768072 A1 | 8/2014 |
| JP | 2003-218611 A | 7/2003 |
| JP | 2004104382 A * | 4/2004 |

OTHER PUBLICATIONS

Written Opinion of the International Searching Authority dated Jan. 24, 2018 in connection with International Patent Application No. PCT/KR2017/011482.

Supplementary European Search Report in connection with European Application No. 17895121.6 dated Feb. 7, 2020, 8 pages.

Office Action dated Nov. 3, 2020 in connection with Chinese Patent Application No. 201780085292.5, 17 pages.

* cited by examiner

LIQUID CRYSTAL-BASED HIGH-FREQUENCY DEVICE AND HIGH-FREQUENCY SWITCH

CROSS-REFERENCE TO RELATED APPLICATION

The present application is related to and claims priority under 35 U.S.C. § 119(a) to Russian Patent Application No. RU2017103134, filed on Jan. 31, 2017, and Korean Patent Application No. 10-2017-0109314, filed on Aug. 29, 2017, the entire contents of which are hereby incorporated by reference.

TECHNICAL FIELD

Various embodiments of the present disclosure relate to a wireless communication device, for example, a liquid crystal-based high-frequency device.

BACKGROUND

The constantly increasing demands of users motivate the rapid development of mobile communication technologies. Currently, 5G millimeter-wave (mm-wave) networks are actively developed. The 5G millimeter-wave networks may require higher performance based on user experience, including factors such as ease of connectivity with nearby devices and improved energy efficiency. Millimeter wave technologies encounter various basic challenges, which are associated with the physics of antenna arrays, high-speed transceiver structures, etc.

The basic challenges and constraints of current high-frequency devices with operating frequencies of 5 GHz or higher, for example, a phase shifter or a high-frequency switching device, are as follows:

1) high losses are encountered in a switching device using standard semiconductor technologies, which results in low energy efficiency;

2) in a switching device using conventional liquid crystal (LC) technologies, the large thickness of an LC layer (above 5 μm) causes slow switching of an electric field in the LC layer at the instant of switch-off of the LC element due to peculiarities of reaction of liquid crystals, for example, the characteristics of liquid crystals that slowly rearrange to a free state (without the effect control voltage); and 3) premature semiconductor components and circuits with low parasitic capacitance characteristics are complex, large, and expensive.

For example, the following high-frequency switching devices are known.

U.S. Pat. No. 6,927,647 B2 (2002 Jun. 1, "Two channels, high speed, RF switch", Ernesto G Starri et al.) discloses a dual channel RF switch with a broadband frequency response. In the disclosed RF switch, an RF signal input to a transformer is provided to first and second biasing circuits. Each biasing circuit includes one or more DC blocking capacitors and a biasing PIN diode. Thus, the biasing circuit provides RF output to an output port. A biasing circuit control signal selectively controls each biasing circuit. When a biasing circuit is biased, the biasing circuit provides a very low resistance to the output load, while in an unbiased condition, the biasing circuit provides a very high resistance or impedance to the output load. The PIN diode provides a biasing element through which the RF signal does not flow.

The disadvantages of this solution are the use of pin-diodes, which leads to using two control signals, a timing system, a control current source (3 to 20 mA), and a complex branched power system, using external elements (resistors, capacitors, inductors), and the relatively high loss of off-the-shelf switch (about 1.5 dB), impossibility to use in a discrete wafer form, and the high cost, which increases with higher frequencies.

U.S. Pat. No. 8,476,804 B2 (2009 Sep. 29, "Piezoelectric MEMS element, voltage control oscillator, communication apparatus, and method of manufacturing piezoelectric drive type MEMS element", Hishinuma Yoshikazu, Fujifilm Corporation) discloses a piezoelectric drive type MEMS element that includes: a first substrate including, in a portion thereof, a movable part, which is driven by a piezoelectric drive section to be displaced in a convex shape, a movable electrode, which is provided on a surface of the movable part; and a second substrate which is bonded to the first substrate and supports a fixed electrode facing the movable electrode via a prescribed gap, wherein the piezoelectric drive section includes a piezoelectric film provided on a region of the first substrate, which forms a movable part as a portion of the movable part, and a pair of electrodes disposed so as to sandwich the piezoelectric film.

The disadvantages of this solution are a very complicated multi-step manufacturing process, the use of external elements (resistors, capacitors, inductors), a high working voltage (about 90 V DC), a limited number of switching cycles, and again a high cost.

U.S. Pat. No. 7,969,359 B2 (2011 Jun. 28, "Reflective phase shifter and method of phase shifting using a hybrid coupler with vertical coupling", Krishnaswamy Harish et al., IBM Corp.) discloses a phase shifter that includes a hybrid coupler which is ground-shielded. The hybrid coupler with reflective terminations connected to the hybrid coupler is configured to phase shift an applied signal wherein the reflective terminations include a parallel LC circuit.

The disadvantages of this solution are the impossibility of use in a discrete wafer form, the enlargement of a branched control system, the necessity to use two control signals and a timing system, and the use of external elements (resistors, capacitors, inductors).

A 30 GHz 5-bit phase shifter produced by TriQuint company is a sophisticated voltage-controlled monolithic 5-bit phase shifter, and causes high losses (about 6 dB). It is impossible to use the phase shifter in a discrete wafer form, and very high costs are incurred.

US 2014/0022029 A1 (2014 Jan. 23, "Nanoparticle-enhanced liquid crystal radio frequency phase shifter", Anatoliy Volodymyrovych Glushchenko, Colorado Springs) discloses a nanoparticle-enhanced liquid crystal phase shifter based on a microstrip line. The disclosed phase shifter realizes an increased phase shift per unit device length (30°/mm at 60 GHz frequency, compared to 8°/mm achieved by another conventional device (U.S. Pat. No. 5,936,484 A (1999 Aug. 10, "UHF phase shifter and application to an array antenna", Dolfi et al., Thomson CSF))) and a reduced (about twice) response time.

However, in the disclosed shifter, absolute values of the liquid crystal layer thickness and the response time are not presented, and the issue of losses is not considered.

SUMMARY

To address the above-discussed deficiencies, it is a primary object to provide high-frequency devices, which simultaneously have low loss (such as no more than 3 dB for a 360-degree phase shifter), small switching time (such as less than 10 ms) and are inexpensive, particularly in developing a wireless communication environment using considerably high operating frequencies of 5 GHz or higher. As disclosed above, however, conventional technologies are not suitable for designing devices that are able to simultaneously meet all of these requirements.

In order to overcome at least some of the aforementioned disadvantages with the prior art, the object of the present disclosure is to provide a high-frequency device including a phase shifter, a switching device, or the like.

A high-frequency device according to various embodiments of the present disclosure and/or a high-frequency switch including the same may include: a signal electrode; a first ground electrode arranged in parallel with the signal electrode; a first liquid crystal layer disposed between the signal electrode and the first ground electrode; and a first dielectric layer disposed between the first liquid crystal layer and the first ground electrode, and/or between the signal electrode and the first liquid crystal layer. The first dielectric layer may have dielectric constant that is higher than the dielectric constant of the first liquid crystal layer.

According to various embodiments of the present disclosure, a high-frequency device and/or a high-frequency switch including the same may include: a signal electrode configured with a combination of a plurality of first segments; a first ground electrode configured with a combination of a plurality of second segments and arranged in parallel with the signal electrode; a first liquid crystal layer disposed between the signal electrode and the first ground electrode; and one or more first distribution electrodes near both ends of each of the signal electrode and the first ground electrode.

The first distribution electrodes may each have a solid plate shape having a width that covers at least some segments of the first and second segments, and may be separated from each of the signal electrode and the first ground electrode by an insulating layer.

The distance between the first and second segments and the first distribution electrodes, the dimension of each of the first and second segments and the first distribution electrodes, and the material that forms the insulating layer may be selected such that the first segments form capacitive coupling in accordance with an applied control voltage, thereby forming a tangential electric field along the arrangement direction of the first segments. Neighboring first distribution electrodes may be disposed to be spaced apart from each other.

A high-frequency device (e.g., a phase shifter) according to various embodiments of the present disclosure and/or a high-frequency switch including the high-frequency device are capable of reducing a loss despite simplification of the structures thereof, and of reducing a switching time.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
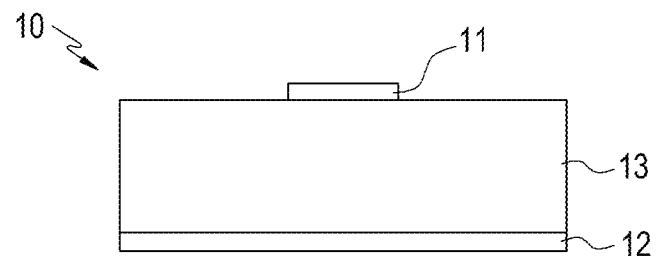
FIG. 1 is a configuration view illustrating a conventional liquid crystal-based high-frequency device.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

As the present disclosure allows for various changes and numerous embodiments, some exemplary embodiments will be described in detail with reference to the accompanying drawings. However, it should be understood that the present disclosure is not limited to the specific embodiments, but the present disclosure includes all modifications, equivalents, and alternatives within the spirit and the scope of the present disclosure.

Although ordinal terms such as "first" and "second" may be used to describe various elements, these elements are not limited by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

Further, the relative terms "a front surface", "a rear surface", "a top surface", "a bottom surface", and the like which are described with respect to the orientation in the drawings may be replaced by ordinal numbers such as first and second. In the ordinal numbers such as first and second, their order is determined in the mentioned order or arbitrarily and may not be arbitrarily changed if desired.

In the present disclosure, the terms are used to describe specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

FIG. 1 is a configuration view illustrating a conventional liquid crystal-based high-frequency device 10.

Referring to FIG. 1, a conventional liquid crystal-based high-frequency device 10 may include a signal electrode 11 and a ground electrode 12 arranged in parallel with each other, and a liquid crystal layer 13 disposed between the signal electrode 11 and the ground electrode 12. When the potential difference between the signal electrode 11 and the ground electrode 12 changes, the directionality of the liquid crystal(s) included in the liquid crystal layer 13 may change, and the dielectric constant of the liquid crystal layer 13 may also change. The high-frequency device 10 utilizing the characteristics of the liquid crystal(s) may be utilized as a phase shifter or a switch in a microstrip transmission line.

In order to ensure a specific inductance required for application to a field that requires low-loss and high-speed switching (e.g., high-frequency, super-high-frequency, or millimeter wave communication), for example, in order to reduce a loss, the distance between electrodes (e.g., the signal electrode 11 and the ground electrode 12) may increase.

Typically, in a liquid crystal-based high-frequency device, when the thickness of the liquid crystal layer is thin, the inductance L per unit length of the high-frequency device may be lowered to cause shielding, and the microstrip line has a low impedance Z (impedance). $Z=\sqrt{L/C}$) Therefore, the power P required for wireless communication (required power $P=J^2L$), and to supply current J that is increased by an amount corresponding to the reduction of the inductance L. For example, when the thickness of the liquid crystal layer in the high-frequency device is thin, the power consumption may increase. In order to compensate for the high loss (high power consumption) due to such low inductance, a thick liquid crystal layer may be formed in a high-frequency device. When a liquid crystal layer having a large thickness is formed, the change in the alignment of liquid crystals throughout the liquid crystal layer may be slowed. For example, the time required for a switch-off operation for switching from a switch-on state to a switch-off state may increase, which may mean that the switching speed is slowed.

According to various embodiments of the present disclosure, by adding a dielectric layer between the signal electrode and the ground electrode of a liquid crystal-based high-frequency device, thereby reducing the thickness of the liquid crystal layer, it is possible to reduce a loss and/or power consumption while achieving a rapid switching speed. In another embodiment, the switching speed of the high-frequency device may increase regardless of the thickness of the liquid crystal layer by forming the signal electrode or the ground electrode of a plurality of segments and applying different control voltages to at least two segments. In some embodiments, when the signal electrode or the ground electrode is formed of a plurality of segments, it is possible to increase the switching speed of the high-frequency device by disposing additional electrodes at both ends of the high-frequency device in the direction in which the segments are arranged to apply a control voltage. For example, a high-frequency device according to various embodiments of the present disclosure is able to reduce a power loss and/or power consumption by utilizing a dielectric layer having a high dielectric constant even if the thickness of the liquid crystal layer is reduced for a fast switching speed. Further, even if the liquid crystal layer is formed to have a large thickness in order to reduce the power consumption, the switching speed, for example, the change in the alignment of the liquid crystals may be accelerated by applying the control voltage.

Hereinafter, various embodiments of the present disclosure will be described with reference to the drawings.

Figure 2:
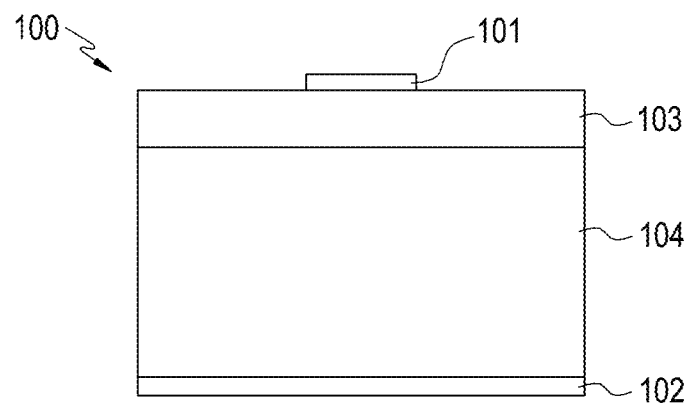
FIG. 2 is a configuration view illustrating a liquid crystal-based high-frequency device according to one of various embodiments of the present disclosure.
Figure 3A:
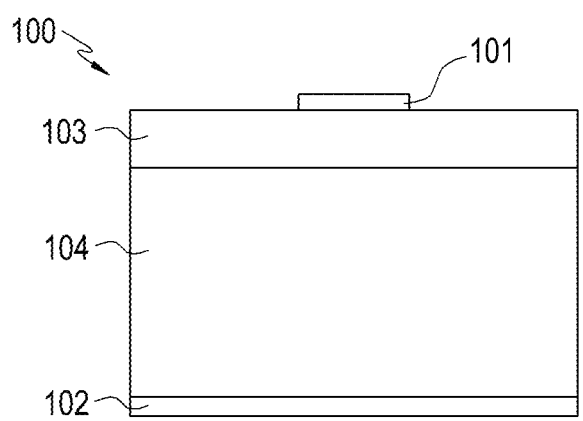
FIGS. 3A and 3B are equivalent circuit diagrams of the high-frequency device according to various embodiments of the present disclosure.
Figure 3B:
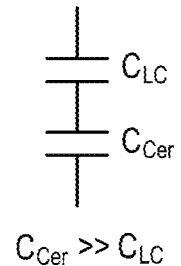

FIG. 2 is a configuration view illustrating a liquid crystal-based high-frequency device 100 according to one of various embodiments of the present disclosure. FIGS. 3A and 3B are equivalent circuit diagrams of the high-frequency device 100 according to various embodiments of the present disclosure.

Referring to FIGS. 2, 3A and 3B, the high-frequency device 100 may include a signal electrode 101, a ground electrode 102, a liquid crystal layer 103 disposed between the signal electrode 101 and the ground electrode 102, and a dielectric layer 104.

The signal electrode 101 and the ground electrode 102 may be formed in a plate shape, for example, in the form of a solid plate or a printed circuit pattern (e.g., a microstrip line). The ground electrode 102 may be arranged substantially in parallel with the signal electrode 101. The liquid crystal layer 103 may include liquid crystals encapsulated between the signal electrode 101 and the ground electrode 102. Although not separately illustrated, at least on the upper and lower surfaces of the liquid crystal layer 103, for example, the surfaces that face the signal electrode 101 and the ground electrode 102, an alignment layer made of polyimide or the like may be provided.

According to various embodiments, the dielectric layer 104 may be disposed between the liquid crystal layer 103 and the signal electrode 101, or between the liquid crystal layer 103 and the ground electrode 102. The dielectric layer 104 may be made of a material selected from materials having low dielectric loss, sufficient electrical/mechanical strength, thermal conductivity, thermal and chemical resistance, and good machinability. For example, the dielectric layer 104 may be made of an oxide-based ceramic, such as MgO—TiO$_2$—La$_2$O$_3$, SrO—TiO$_2$—MgO—ZnO, or BaO—TiO$_2$.MnO$_2$, or an organic material mixture filled with a ceramic, and may have a dielectric constant of about 100 or a dielectric constant of 100 or more.

According to various embodiments, the liquid crystal layer 103 may have an equivalent unit length capacitance $C_{LC}$, and the dielectric layer 104 may have an equivalent unit length capacitance $C_{Cer}$. The equivalent unit length capacitance $C_{Cer}$ of the dielectric layer 104 may be much higher than the equivalent unit length capacitance $C_{LC}$ of the liquid crystal layer 103. Therefore, when the control voltage or the like is applied in the high-frequency device 100, electric field energy may be concentrated in the liquid crystal layer 103. When the capacitance $C_{Cer}$ is relatively reduced, higher electric field energy may be accumulated in the dielectric layer 104. For example, when the capacitance $C_{Cer}$ relatively decreases, the capacitance $C_{LC}$ increases, and when the control voltage is applied, the change in the alignment of liquid crystals of the liquid crystal layer 103 may be slowed. Thus, when the unit length capacitance $C_{LC}$ is set, the minimum value of the capacitance $C_{Cer}$ may be determined by a minimum relative rearrangement at the phase velocity of waves in the high-frequency device 100.

The requirement for the dielectric constant of such a dielectric layer (e.g., the dielectric layer 104) may be revealed through the facts that it can be desirable to maintain the relative rearrangement of the liquid crystal layer 103, and that it can be desirable for the thickness of the dielectric layer 104 to allow a loss of a predetermined level. For example, in the case where the liquid crystals have a rearrangement a (rearrangement $$a = \frac{\varepsilon_{eff//}}{\varepsilon_{eff\perp}})$$

and the deterioration of rearrangement in a line is not be greater than b, for example, in the case where the rearrangement of effective dielectric constants in a line including a composite dielectric material is not be greater than a*b, the requirement for the effective unit length capacitance of the dielectric layer 104 based on a parallel connection model of two plane-parallel capacitors may be as follows: C2=C1 (ab−1)/(1−b). Here, C$_2$ is the unit length capacitance of the dielectric layer and C1 is the minimum unit length capacitance of the liquid crystal layer, corresponding to $\varepsilon_{eff\perp}$, a>1 and 0<b<1. For example, in the case where a liquid crystal layer has a thickness of 5 micrometers and a minimum dielectric constant of 2.6, and the thickness of the dielectric layer is 100 micrometers, when a=1.4, b=0.9, and C$_2$=2.6C$_1$, the relative dielectric constant required for the dielectric layer is 135.2. However, it should be noted that this calculated value is somewhat overestimated because an edge effect on the signal electrode (e.g., the signal electrode 101) is not taken into consideration for simplicity of explanation.

In the foregoing, the dielectric constants, the thicknesses and the like have been illustrated and described in order to facilitate the understanding of the various embodiments of the present disclosure. However, in various embodiments of the present disclosure, the thicknesses or the like of the respective layers, such as the liquid crystal layer and the dielectric layer, may be properly changed depending on design values for the use environment, the required specification of a high-frequency device to be manufactured, or a distance between electrodes, a required switching time, and the like. In addition, FIG. 2 illustrates a configuration in which the dielectric layer 104 is disposed between the liquid crystal layer 103 and the ground electrode 102, as an example. However, the dielectric layer 104 may be disposed between the liquid crystal layer 103 and the signal electrode 101, or the dielectric layers 104 may be disposed between the liquid crystal layer 103 and the signal electrode 101 and between the liquid crystal layer 103 and the ground electrode 102, respectively.

Figure 4:
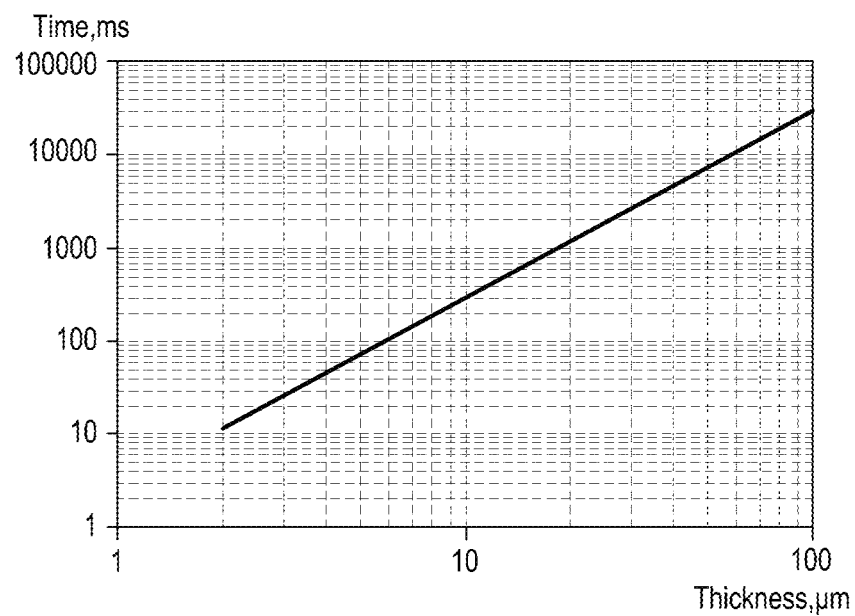
FIG. 4 is a graph for describing switch-off time depending on the thickness of an ordinary liquid crystal layer in a high-frequency device.
Figure 5:
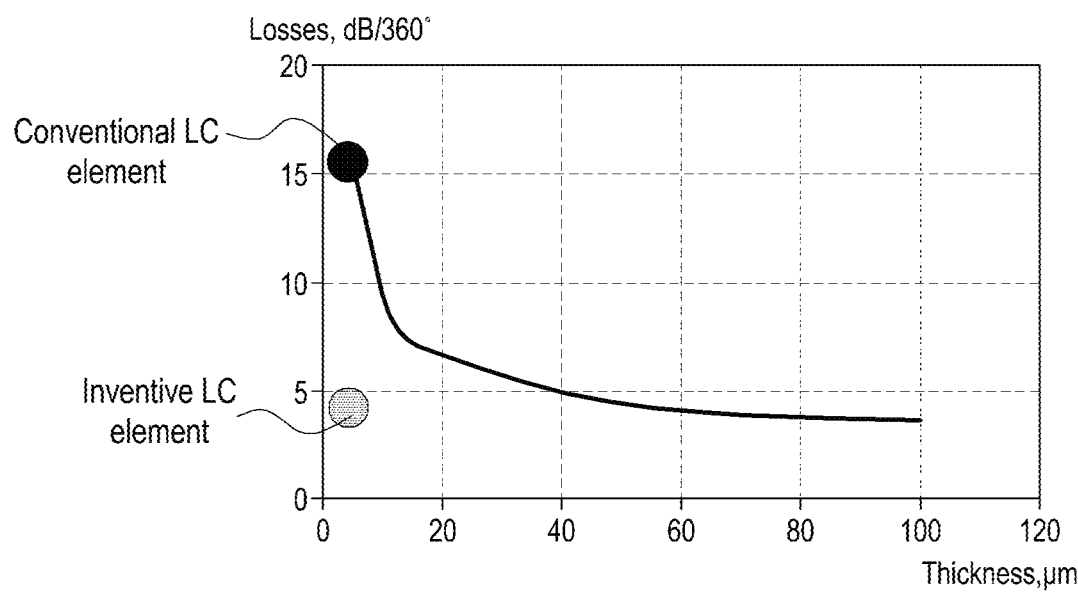
FIG. 5 is a graph for describing losses depending on the thickness of the liquid crystal layer in the high-frequency device according to one of various embodiments of the present disclosure.

FIG. 4 is a graph for describing switch-off time depending on the thickness of an ordinary liquid crystal layer in a high-frequency device. FIG. 5 is a graph for describing losses depending on the thickness of the liquid crystal layer in the high-frequency device according to one of various embodiments.

FIG. 4 is a graph representing the estimated dependency of switch-off time depending on the thickness of liquid crystal layers (for example, the liquid crystal layers 13 and 103 in FIG. 1 or 2) at the frequency of 28 GHz for a strip line 360-degree phase shifter. Referring to FIG. 4, it can be seen that the switch-off time, for example, the time required for the change in the alignment of liquid crystals, gradually increases depending on the thickness of the liquid crystal layers 13 and 103. For example, when the switch-off time is to be reduced in a high-frequency device, the thickness of the liquid crystal layer may be reduced. The estimation result (calculation result) exemplified in FIG. 4 was obtained assuming a liquid crystal mixture in which a viscosity $\gamma$=0.45 PA*s, a breakdown voltage $V_{th}$=5V, and a difference between vertical and parallel relative dielectric constants at low frequencies was 6.

However, as described above, when the thickness of the liquid crystal layer is simply reduced for a fast switching operation (short switch-off time), the loss increases and the power consumption increases. FIG. 5 illustrates the estimated dependency according to the loss due to the thickness of a liquid crystal layer at a frequency of 28 GHz for a strip line phase shifter having a 360-degree control range for a phase difference of a transmission signal with respect to the maximum/minimum dielectric constant of a liquid crystal mixture. Referring to FIG. 5, it can be seen that, in a conventional high-frequency device (e.g., the high-frequency device 10 of FIG. 1), the thickness of the liquid crystal layer (e.g., the liquid crystal layer 13 in FIG. 1) ranges from about 5 micrometers to about 15 dB/360 degrees and the loss decreases as the thickness of the liquid crystal layer increases, in the high-frequency device (e.g., the high-frequency device 100 in FIG. 2) according to various embodiments of the present disclosure, the loss is only 3.7 dB/360 degrees even though the thickness of the liquid crystal layer (e.g., the liquid crystal layer 103 in FIG. 2) is about 2 micrometers. The estimation results (calculation results) illustrated in FIG. 5 were obtained on the assumption that the high-frequency device according to an embodiment of the present disclosure includes a dielectric layer (e.g., dielectric layer 104 of FIG. 2) having a relative dielectric constant of 100, a dielectric loss-angular tangent of 0.001, and a thickness of 100 micrometers. In addition, the estimation result was obtained on the assumption that the liquid crystal layer in each of the conventional high-frequency device and a high-frequency device according to the embodiment of the present disclosure is formed of a liquid crystal mixture having the maximum relative dielectric constant of 3.6, the minimum relative dielectric constant of 2.6, and the dielectric loss-angular tangent of 0.008. In addition, the width of the strip line for each thickness of the liquid crystal layers was selected to provide the minimum loss in a fixed 360-degree control range.

As illustrated in FIGS. 4 and 5, in the high-frequency device (e.g., the high-frequency device 10 in FIG. 1) including only a liquid crystal layer between the signal electrode and the ground electrode, one can reduce the thickness of the liquid crystal layer in order to reduce the switch-off time, which may result in a high loss. According to various embodiments of the present disclosure, the high-frequency device (e.g., the high-frequency device 100 of FIG. 2) includes a dielectric layer (e.g., the dielectric layer 104 of FIG. 2) between the signal electrode and the ground electrode with a liquid crystal layer so that it is possible to reduce the loss while implementing a quick switch-off operation by reducing the thickness of the liquid crystal layer. For example, with the conventional high-frequency device, even though a switch-off time of 12 ms may be secured by forming the liquid crystal layer having a thickness of 2 micrometers, a loss of about 15 dB/360 degrees is required. On the other hand, in the high-frequency device according to various embodiments of the present disclosure, the loss may be only 3.7 dB/360 degrees even though the high-frequency device has the same thickness of the liquid crystal layer and the same switch-off time.

Figure 6:
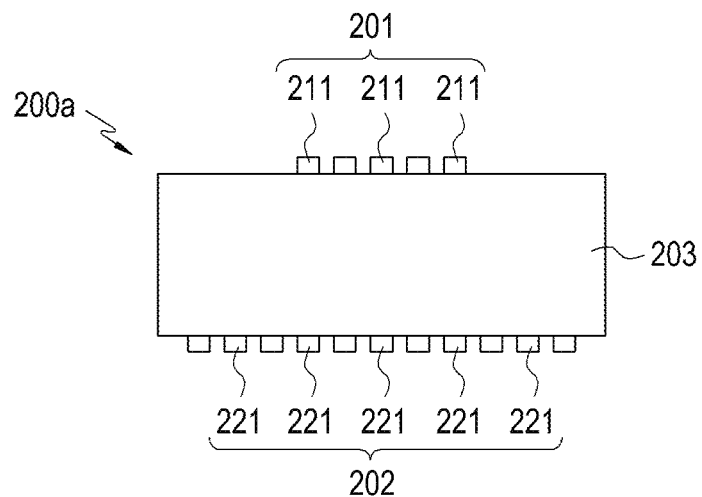
FIG. 6 is a configuration view illustrating a liquid crystal-based high-frequency device according to another one of various embodiments of the present disclosure.
Figure 7:
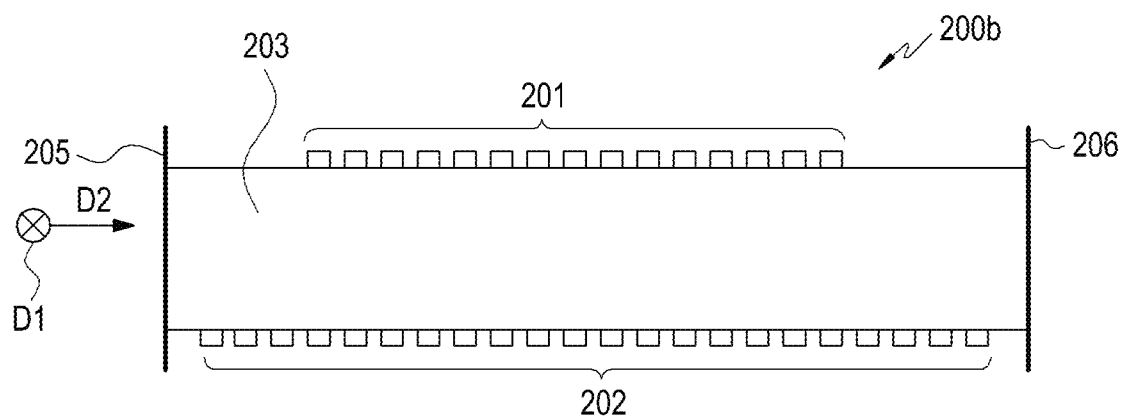
FIG. 7 is a configuration view illustrating a modification of the high-frequency device according to another one of various embodiments of the present disclosure.

FIG. 6 is a configuration view illustrating a liquid crystal-based high-frequency device 200a according to another one of various embodiments of the present disclosure. FIG. 7 is a configuration view illustrating a modification 200b of the high-frequency device according to another one of various embodiments of the present disclosure.

Referring to FIGS. 6 and 7, the high-frequency devices 200a and 200b (e.g., the high-frequency device 100 of FIG. 2) according to various embodiments of the present disclosure may include a signal electrode 201 and/or a ground electrode 202 which are configured with combinations of a plurality of segments 211 and 221, respectively, and only a liquid crystal layer 203 may be disposed between the signal electrode 201 and the ground electrode 202. The first segments 211, which constitute the signal electrode 201, may extend in a first direction D1 (e.g., the extension direction of the liquid crystal layer 203) while being arranged in a second direction D2 (e.g., the width direction of the liquid crystal layer 203) perpendicular to the first direction D1. The second segments 221, which constitute the ground electrode 202, may be arranged in the second direction D2 while extending along the first direction D1.

In the high-frequency devices 200a and 200b described above, a control voltage may be applied to each of the signal electrode 201 and the ground electrode 202, in the switch-on operation for the vertical alignment of liquid crystals. In order to apply such a control voltage, the high-frequency devices 200a and 200b may further include a distribution electrode(s), which will be described in more detail with reference to FIG. 13 and the like. As the control voltage is applied, an electric field in a vertical direction (e.g., an up-down direction in FIG. 6) may be formed between the signal electrode 201 and the ground electrode 202, and the liquid crystal(s) in the liquid crystal layer 203 may be aligned in the vertical direction.

According to various embodiments, during a switch-off operation for the horizontal alignment of the liquid crystals (e.g., in the second direction D2 in FIG. 6), different voltages may be applied to some of the first segments 211 (or some of the second segments 221) in the high-frequency devices 200a and 200b. For example, among the first segments 211, which constitute the signal electrode 201, the segments disposed at both ends in the second direction D2 are connected to the control voltage source through filter circuits. As the control voltage is applied, capacitive coupling occurs between adjacent segments, so that a tangential electric field in the horizontal direction may be formed in the entire liquid crystal layer 203. Accordingly, the liquid crystal(s) in the liquid crystal layer 203 may be aligned in the horizontal direction according to the distribution of the tangential electric field. In the switch-off operation for the horizontal alignment of the liquid crystals, the control voltage applied to the signal electrode 201 and the ground electrode 202 (e.g., the control voltage applied for the vertical alignment of the liquid crystals) may be cut off. According to one embodiment, when a switch-off operation is performed by applying a control voltage to some of the segments, a voltage may also be selectively applied to the remaining segments. This selective application of the voltage may facilitate the capacitive coupling between adjacent segments (e.g., the first and second segments 211 and 221).

For example, the high-frequency device (e.g., the high-frequency devices 200a and 200b in FIG. 6 or 7) according to various embodiments of the present disclosure may perform a quick switch-on/off operation by selectively receiving the control voltage for the vertical alignment of liquid crystals as well as the control voltage for the horizontal alignment of the liquid crystals.

According to various embodiments, in applying the control voltage for the switch-on operation and/or the switch-off operation, decoupling between the control voltage and the transmission signal may be performed through a filter implemented on each of the transmission lines by utilizing a quarter-wave line, or the like. In another embodiment, decoupling between the control voltage and the transmission signal may be performed through a resistor (resistive sputtering) by a known method.

Referring to FIG. 7, the high-frequency device 200b may further include an additional electrode(s) (e.g., a side electrode(s)) to which a control voltage for the switch-off operation is applied. For example, in the second direction D2, additional electrodes (or side electrodes) 205 and 206 may be disposed on both ends (e.g., sides) of the high-frequency device 200b. In one embodiment, in the switch-off operation, for example, the control voltage applied to the signal electrode 201 and the ground electrode 202 may be cut off, and the control voltage may be applied to the side electrodes 205 and 206. When the control voltage is applied to the side electrodes 205 and 206, the segments arranged in the second direction D2 (e.g., the first segments 211 and/or the second segments 221) form capacitive coupling, and a tangential electric field for horizontal alignment of the liquid crystals in the liquid crystal layer 203 may be formed between the side electrodes 205 and 206.

In one embodiment, the sizes of the segments (e.g., the first and second segments 211 and 221), which constitute the signal electrode 201 and/or the ground electrode 202 may be the same. According to another embodiment, the segments may each include some segments that have different widths depending on the positions thereof, respectively. For example, any one segment may have a width that gradually increases or decreases as progressing from one end to the other end. According to still another embodiment, the segments of the signal electrode 201 and/or the ground electrode 202 may have different widths, lengths, and/or thicknesses.

Figure 8:
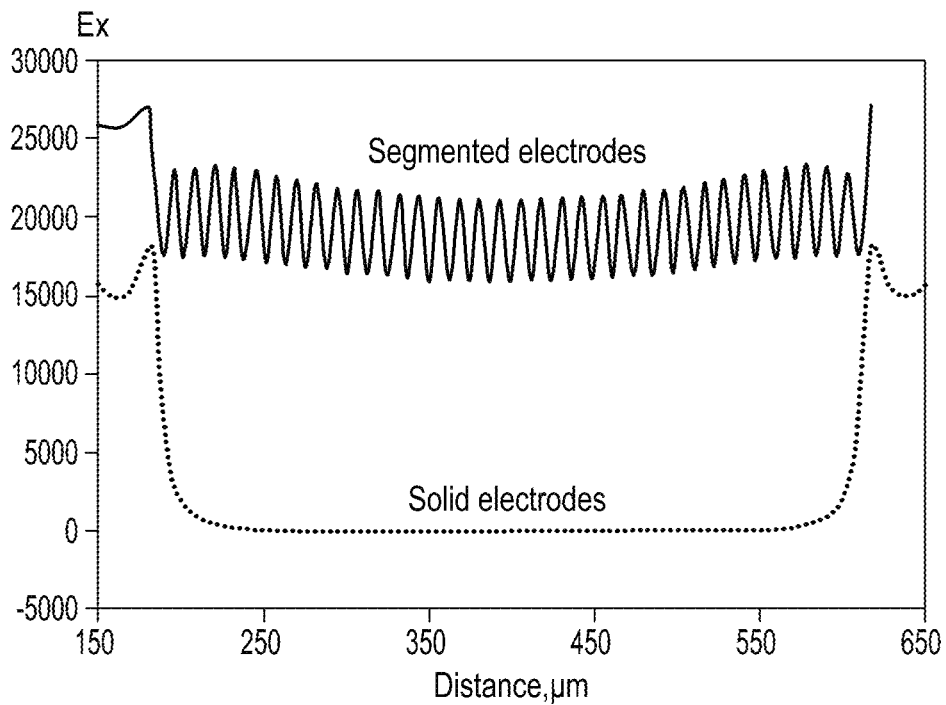
FIG. 8 is a graph for describing a tangential electric field distribution of the high-frequency device according to another one of various embodiments of the present disclosure.

FIG. 8 is a graph for describing a tangential electric field distribution of the high-frequency device according to another one of various embodiments of the present disclosure.

FIG. 8 illustrates a tangential electric field distribution in the case where side electrodes (e.g., the side electrodes 205 and 206 in FIG. 7) are utilized within each of a high-frequency device in which the signal electrode and/or the ground electrode are formed in the form of a solid plate (e.g., the high-frequency device 100 illustrated in FIG. 2) and each high-frequency device constituted with a combination of segments (e.g., the high-frequency device 200b in FIG. 7), in which the tangential electric fields Ex according to a distance measured from one end of the high-frequency device to the other end in the second direction (e.g., the second direction D2 in FIG. 7) are represented. As illustrated in FIG. 8, it can be seen that when the signal electrode and/or the ground electrode are in the form of a solid plate, a tangential electric field is not substantially formed even when a control voltage for horizontal alignment is applied through the side electrodes or the like, but when the signal electrode and/or the ground electrode are constituted with a combination of segments, a tangential electric field of some degree is formed. When the signal electrode and/or the ground electrode are made up of a combination of segments, it is believed that each of the segments arranged in the second direction D2 forms capacitive coupling with a segment adjacent thereto, thereby forming a predetermined level of tangential electric field in the liquid crystal layer.

Accordingly, when the signal electrode (e.g., the signal electrode 201 of FIG. 7) and/or the ground electrode (e.g., the ground electrode 202 of FIG. 7) are each implemented with a combination of a plurality of segments, and a control voltage for a switch-off operation is applied thereto, it is possible to control the rearrangement of the liquid crystals in the liquid crystal layer 203. That is, since the switch-on/off operation can be performed by actively controlling the electric field in the liquid crystal layer 203, the operation time can be reduced not only in the switch-on operation, but also in the switch-off operation.

Figure 9:
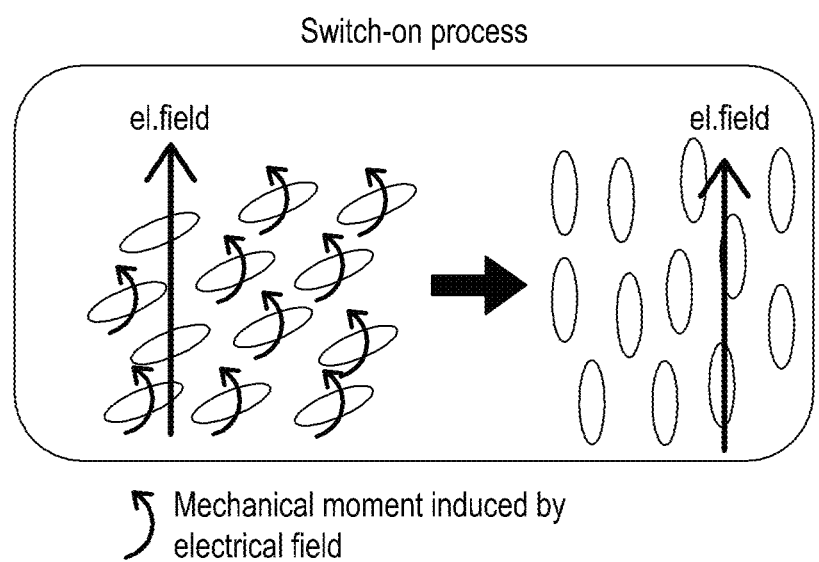
FIGS. 9 to 11 are views for describing switch-on and switch-off operations of a liquid crystal-based high-frequency device.
Figure 10:
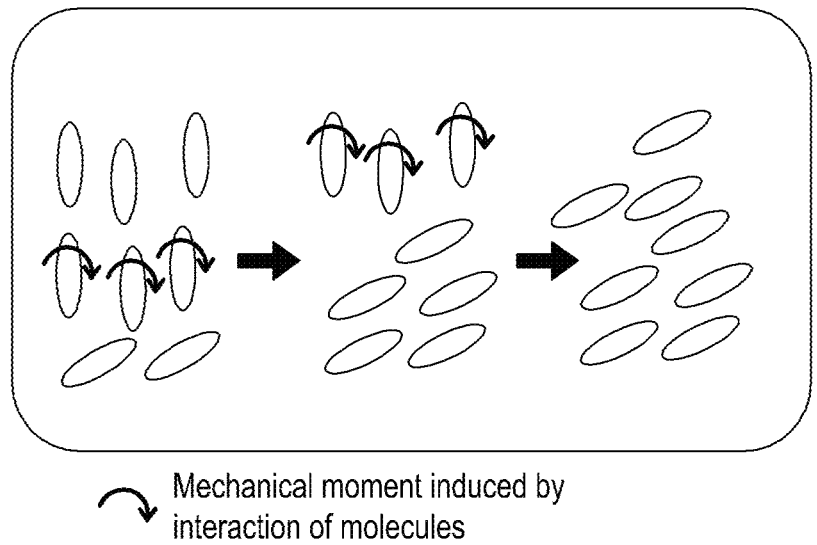
Figure 11:
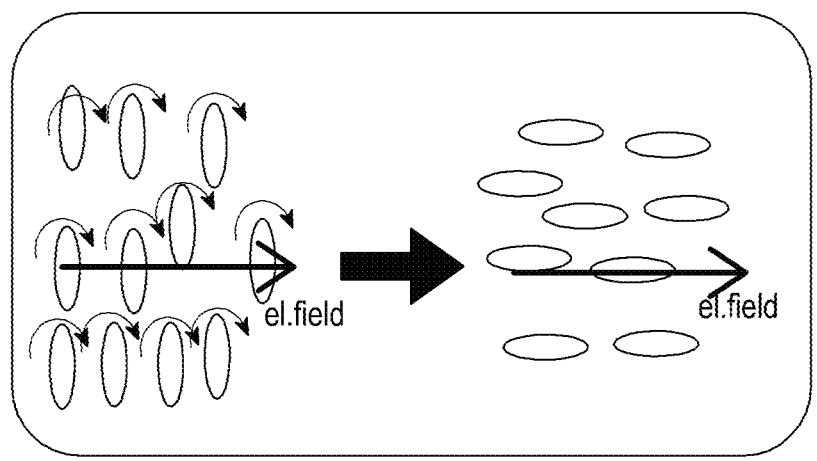

FIGS. 9 to 11 are views for describing switch-on processes and switch-off processes of a liquid crystal-based high-frequency device (e.g., the high-frequency device 200b of FIG. 7).

Referring to FIG. 9, when a control voltage is applied to, for example, the signal electrode 201 and the ground electrode 202 in the switch-on operation, an electric field in the vertical direction may be formed in the liquid crystal layer 203, and the liquid crystals in the liquid crystal layer 203 may be aligned in the vertical direction substantially at the same time.

Referring to FIG. 10, when a separate control voltage is not applied in the switch-off operation (passive switch-off process), the liquid crystals are aligned substantially in the horizontal direction by interaction with an alignment layer or interaction with adjacent liquid crystals. However, the change in the alignment of the liquid crystals is sequentially performed from the liquid crystals adjacent to the alignment layer (e.g., the liquid crystals located at the lower side in the arrangement of the liquid crystals in FIG. 10), and thus, it may take a considerable amount of time until the change in alignment is completed in the entire liquid crystal layer, for example, until the switch-off operation is completed. It has been described with reference to, for example, FIGS. 1 to 5 that in such a switch-off operation, a longer time is required as the thickness of the liquid crystal layer increases. For example, in this passive switch-off operation, various embodiments of the present disclosure may reduce the thickness of the liquid crystal layer while reducing a loss by disposing a dielectric layer having a dielectric constant significantly larger than that of the liquid crystal layer, thereby reducing the time required for the switch-off operation.

Referring to FIG. 11, by applying different control voltages to some of the segments that constitute the signal electrode and/or the ground electrode in the switch-off operation, or the additional electrodes (for example, the side electrodes 205 and 206 in FIG. 7) provided in the high-frequency device, it is possible to quickly align the liquid crystals in the horizontal direction. For example, when the control voltage applied to the signal electrode 201 and the ground electrode 202 is cut off, and the control voltage is applied to some of the segments (e.g., the first and second segments 211 and 221 in FIG. 6) or the additional electrodes (e.g., the side electrodes 205 and 206 in FIG. 7), a tangential electric field is formed in the liquid crystal layer 203, and the liquid crystals in the liquid crystal layer may be aligned in the horizontal direction at substantially the same time.

Since the high-frequency device performs the switch-off operation by applying the control voltage, a quick switch-off operation may be performed irrespective of the thickness of the liquid crystal layer. For example, in the high-frequency device according to the present embodiment, even if the liquid crystal layer is formed to have a thickness of about 100 micrometers, the switch-off operation may be completed within a time of about 10 ms.

Meanwhile, as described above, when only the liquid crystal layer is disposed between the signal electrode and the ground electrode in a liquid crystal-based high-frequency device, an improvement in terms of a loss can be obtained as the thickness of the liquid crystal layer increases. The loss of the high-frequency device according to another of the various embodiments of the present disclosure will be described with reference to FIG. 12.

Figure 12:
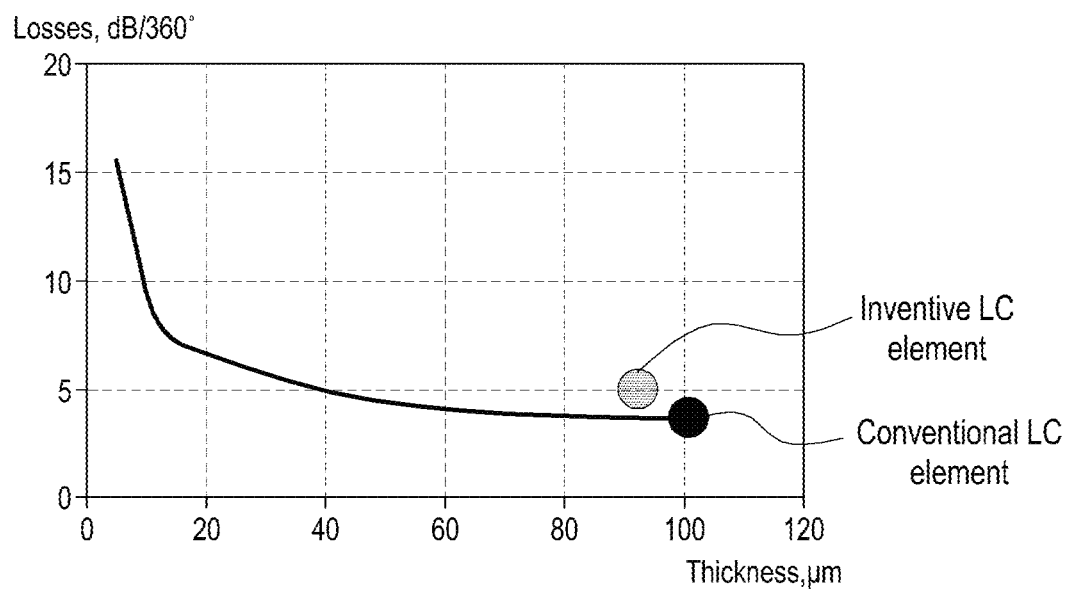
FIG. 12 is a graph for describing losses depending on the thickness of the liquid crystal layer in the high-frequency device according to another one of various embodiments of the present disclosure.

FIG. 12 is a graph for describing losses depending on the thickness of the liquid crystal layer in the high-frequency device according to another one of various embodiments of the present disclosure.

FIG. 12 is a graph representing the estimated dependence of losses according to the thickness of the liquid crystal layer of the high-frequency device (e.g., the high-frequency device 200b in FIG. 7) at a frequency of 28 GHz for a strip line 360-degree phase shifter. It can be seen that the high-frequency device 200b has an increased loss characteristic compared with a conventional high-frequency device when the thickness of the liquid crystal layer is 100 micrometers, but the difference is not substantially large, and the time required for the switch-off operation can be greatly reduced.

As described above, the high-frequency device (e.g., the high-frequency device 200a of FIG. 6) according to various embodiments of the present disclosure may further include a distribution electrode. The distribution electrode may be in the form of a solid plate, and may be used for coupling with an input/output port of a high-frequency switch or the like equipped with the high-frequency device and/or for evenly distributing current to the segments that constitute the signal electrode or the ground electrode of the high-frequency device. Hereinafter, a high-frequency device including such a distribution electrode will be described with reference to FIG. 13 or the like.

Figure 13:
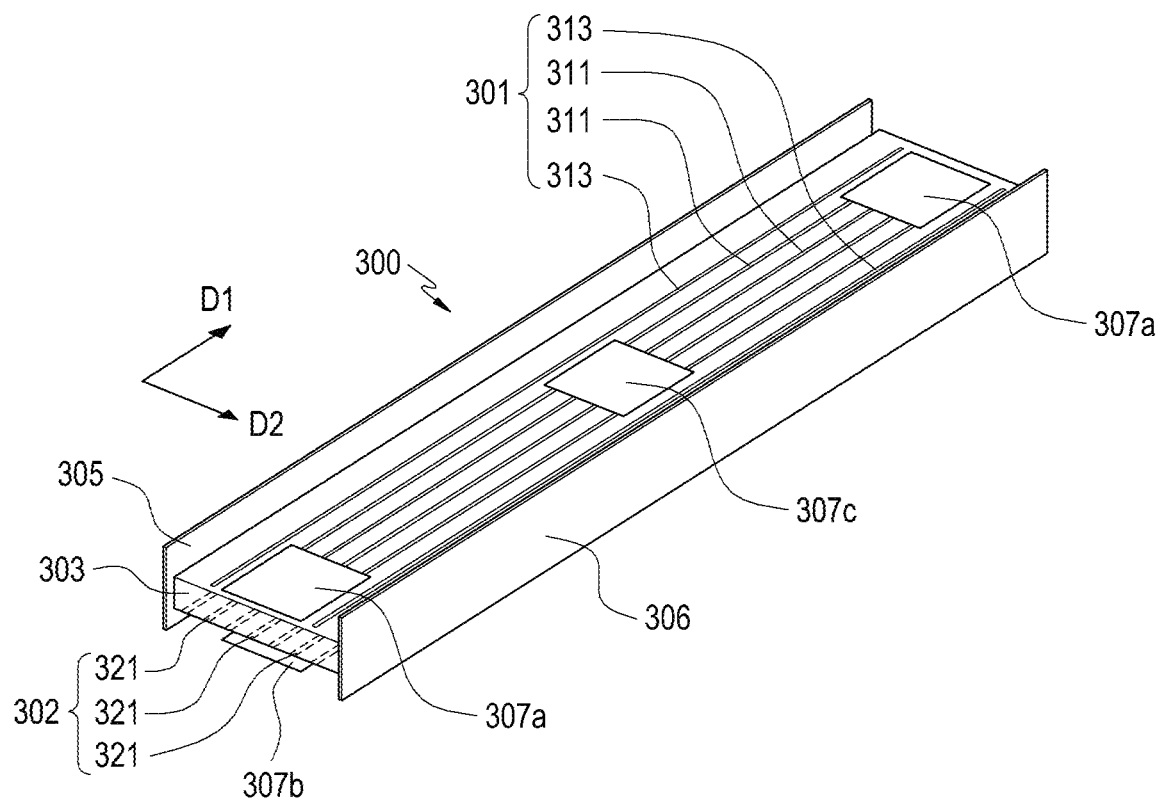
FIG. 13 is a perspective view illustrating an implementation example of the high-frequency device according to another one of various embodiments of the present disclosure.
Figure 14:
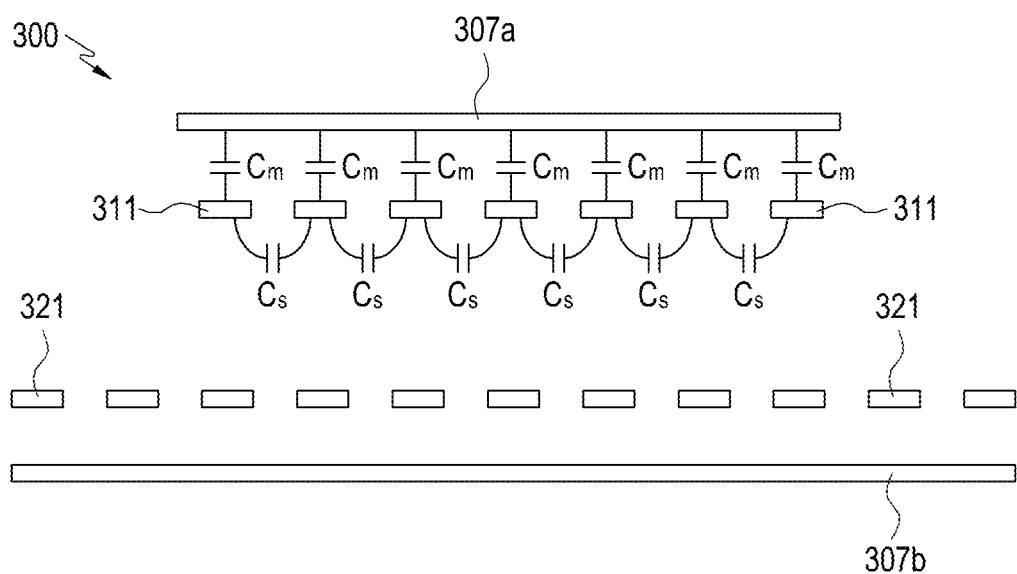
FIG. 14 is an equivalent circuit of the high-frequency device according to another one of various embodiments of the present disclosure.
Figure 15A:
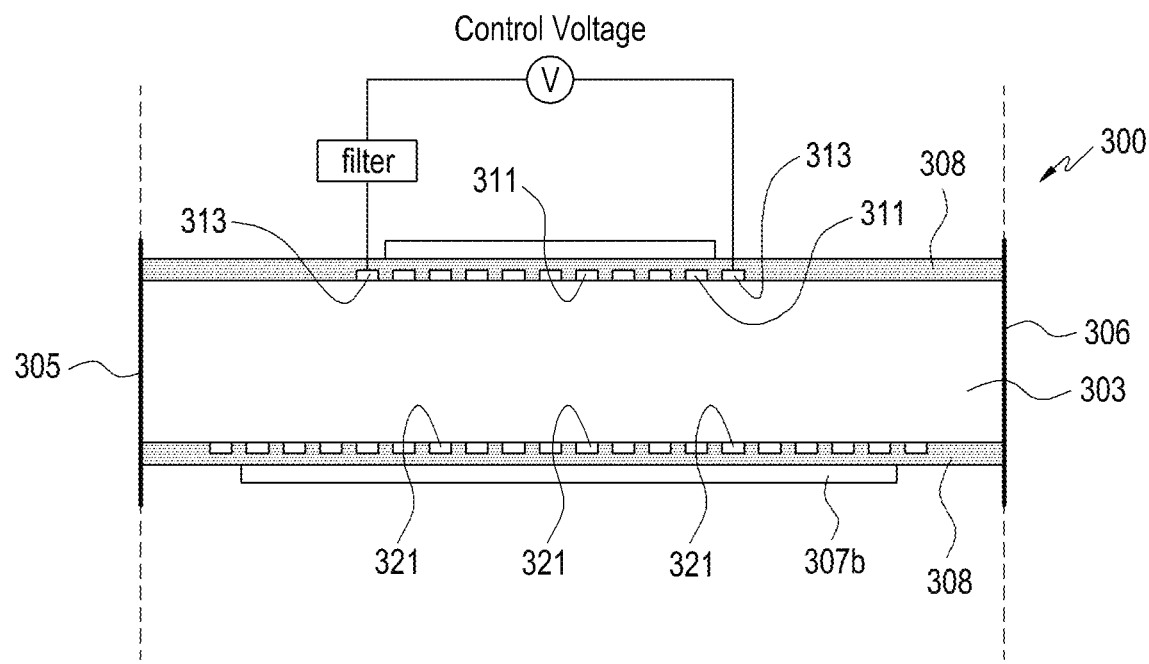
FIG. 15A is another embodiment of the high-frequency device.
Figure 15B:
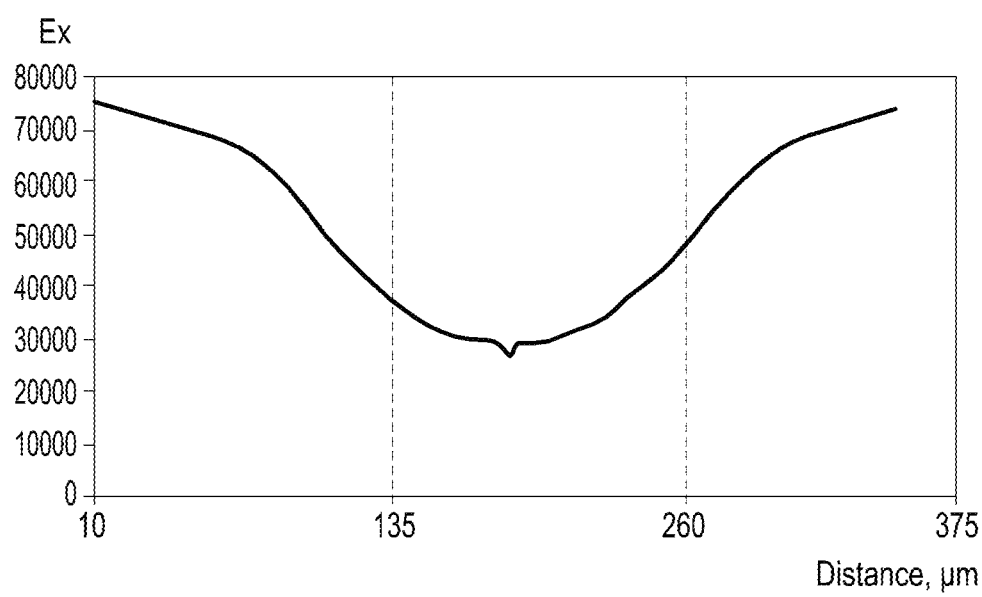
FIG. 15B is a graph for describing a tangential electric field distribution of the high-frequency device according to another one of various embodiments of the present disclosure.

FIG. 13 is a perspective view illustrating an implementation example of a high-frequency device 300 according to another one of various embodiments of the present disclosure. FIG. 14 is an equivalent circuit diagram of the high-frequency device 300 according to another one of various embodiments of the present disclosure. FIG. 15B is a graph for describing a tangential electric field distribution of the high-frequency device 300 (FIG. 3A) according to another one of various embodiments of the present disclosure.

Referring to FIGS. 13 to 15A, the high-frequency device 300 may include a signal electrode 301 configured with a combination of first segments 311 and 313, a ground electrode 302 configured with a combination of second segments 321, additional electrodes 305 and 306 arranged at both ends of the high-frequency device 300 (e.g., both ends of the high-frequency device 300 in the direction in which the first segments 311 and 313 and/or the second segments 321 are arranged), and distribution electrodes 307a, 307b and 307c disposed on the segments 311, 313 and 321, respectively. A liquid crystal layer 303 is disposed between the signal electrode 301 and the ground electrode 302 and depending on a control voltage applied to some of the electrodes 301, 302, 307a, 307b, 307c or the segments 311, 313, and 321, the liquid crystal alignment in the liquid crystal layer 303 may be changed.

According to various embodiments, the first segments 311 and 313 and/or the second segments 321 may extend in a first direction D1, and may be arranged in a second direction D2 that is perpendicular to the first direction D1. The distribution electrodes 307a, 307b and 307c may include first distribution electrodes 307a and 307b located near both ends of the signal electrode 301 and the ground electrode 302 (e.g., both ends of each of the first and second discharge electrodes 302 in the first direction D1). The first distribution electrodes 307a and 307b may be formed of a solid plate having a width that covers at least some of the first or second segments 311, 313, or 321 corresponding to each of the first distribution electrodes 307a and 307b, and may be utilized as an input or output port of the high-frequency device 300. For example, in the input or output port of the high-frequency device 300, a transition to the electrodes configured with a combination of segments (e.g., at least some of the segments 311 and/or the segments 321 among the first segments) may be formed in the electrodes (e.g., the first distribution electrodes 307a and 307b) in the form of a solid plate. In a certain embodiment, the high-frequency device 300 may further include a second distribution electrode(s) 307c disposed between the first distribution electrodes 307a and 307b in the first direction D1. In another embodiment, the distribution electrodes 307a and 307c disposed on the signal electrode may be disposed at positions that are spaced apart from each other so as not to overlap with other neighboring distribution electrodes 307a and 307c, and may not be in direct contact with each other. This is also applicable to the distribution electrodes 307b and 307c disposed on the ground electrode.

According to one embodiment, an insulating layer 308 (see FIG. 15A) may be formed between the distribution electrodes 307a, 307b, 307c and the signal electrode 301 (e.g., the first segments 311 and 313) and/or the ground electrode 302 (e.g., the second segments 321). For example, the first distribution electrodes 307a and 307b may not be in direct contact with the signal electrode 301 and/or the ground electrode 302, but may distribute current to the first segments 311 and 313 and/or the second segments 321. The insulating layer 308 is referred to as an "insulating layer" to be distinguished from the above-described dielectric layer (e.g., the dielectric layer 104 in FIG. 2) described above, and may have a dielectric constant of a certain magnitude.

According to various embodiments, at least one of the distribution electrodes 307a, 307b, and 307c may be formed to have a width that does not cover some segments (the segments indicated by reference numeral 313, among the first segments 311, 313). For example, as illustrated in FIG. 14, some of the first segments 311 and 313 that constitute the signal electrode 301 (e.g., the segments 313 disposed at both ends in the arrangement of the first segments) may not be covered with the first distribution electrode 307a (or the second distribution electrode 307c). In one embodiment, the segment(s) indicated by reference numeral "313" may be utilized as an electrode to which a control signal for a switch-off operation is applied. For example, the segments 313 may be connected to a control voltage source V (see FIG. 15A), and may form a tangential electric field in the liquid crystal layer 303 for horizontal alignment when a control voltage is applied thereto. In a certain embodiment, a control voltage source V may be connected to the side electrodes 305 and 306, but may be connected to the control voltage source via a filter circuit.

According to various embodiments, the distance between the first segments 311 and 313, the distance between each of the first segments 311 and 313 and the distribution electrodes 307a and 307c, and the material, size, thickness, and the like of the insulating layer 308 may be selected to provide an environment capable of forming a tangential electric field as described above. For example, when a control voltage is applied to the segments 313, the first segments 311 and 313 form capacitive coupling with other adjacent first segments, and the distance, the material, size, thickness, and the like thereof may be designed so as to form a tangential electric field in the arrangement direction thereof, for example, the second direction D2. This will be described in more detail with reference to FIG. 14.

In FIG. 14, "Cs" indicates a capacitance between adjacent first segments 311 and 313, and "Cm" indicates a capacitance between each of the first segments 311 and 313 and a distribution electrode (e.g., the first distribution electrode 307a). According to various embodiments, the smaller the capacitance Cm, the better the tangential electric field that can be formed in the space (e.g., the liquid crystal layer 303) between the signal electrode 301 and the ground electrode 302. As an example, when the condition "Cs/N>>Cm" (in which "N+1" is the number of the first segments 311 and 313) is satisfied, for example, when the condition "Cm<0.1Cs/N" is satisfied, the influence of the distribution electrodes 307a, 307b, and 307c can be suppressed and a good tangential electric field can be formed. When this condition is satisfied and when the control voltage is applied to the segments 313, all of the energy of the electric field is concentrated on the capacitance Cs corresponding to the region between the first segments 311 and 313, so that a good tangential electric field can be formed, and as a result, the switch-off operation of the high-frequency device 300 can be quickly performed. On the other hand, at the signal frequency, examples of the capacitive impedance of the capacitance (N+1)Cm can be as small as possible compared to the wave impedance of a line. For example, assuming that "$Z_0$" is the wave impedance of a line, when a reflection of −10 dB at a transition (e.g., a transition formed between a distribution electrode and a signal electrode, or a transition formed by a distribution electrode and a ground electrode) corresponds to a parallel capacitive impedance of $0.7Z_0$ (the total impedance of the signal electrode and the ground electrode, a good matching performance may be assured even if a separate matching circuit is not used at the input and output of the high-frequency device 300. However, if desirable, the matching performance can be improved by utilizing a matching circuit or the like commonly used in a transmission line. Also, the capacitance Cs may be proportional to the length of each of the segments (e.g., the first and second segments 311, 313, and 321), and the size of the distribution electrode corresponding to a reflection level given at the transition formed by the distribution electrode and the signal electrode (or ground electrode) may be fixed. Thus, the ratio between the capacitances Cs and Cm for the formation of a good tangential electric field may be obtained by increasing the length of each segment. When there is a plurality of distribution electrodes, the requirement between capacitances may be obtained by using the value of the length of the segment(s) divided by the number of distribution electrodes of the high-frequency device for evaluation of the capacitance Cs. Formulas for evaluating the capacitance Cs are presented through an electrode system simulation in various software systems or through various references. The capacitance Cm may be evaluated using an equation "$Cm=\varepsilon\varepsilon_0 lw/d$". Here, "$\varepsilon$" is the relative dielectric constant in the region between the distribution electrode and the signal electrode (or the ground electrode), "$\varepsilon_0$" is the vacuum dielectric constant, "l" is the length of the distribution electrode measured in the direction in which the segments extends, "w" the width of the segments, and "d" is the distance between the distribution electrode and the signal electrode. FIG. 15B illustrates the distribution of a tangential electric field Ex formed in the liquid crystal layer in the high-frequency device including the above-described distribution electrode(s).

Figure 16:
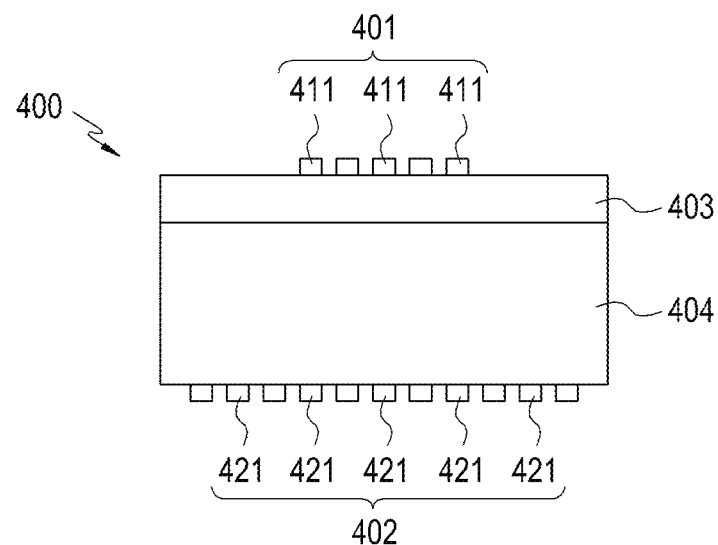
FIG. 16 is a configuration view illustrating a liquid crystal-based high-frequency device according to still another one of various embodiments of the present disclosure.

FIG. 16 is a configuration view illustrating a liquid crystal-based high-frequency device 400 according to still another one of various embodiments of the present disclosure.

According to various embodiments, the high-frequency device 400 is an example of a combination of the high-frequency device 100 of FIG. 2 and the high-frequency device 200a of FIG. 6, and may include a signal electrode 401, a ground electrode 402, each of which is constituted with a combination of segments 411 or 421, and a liquid crystal layer 403 and a dielectric layer 404 between the signal electrode 401 and the ground electrode 402. For example, by including the dielectric layer 404, the high-frequency device 400 have a low loss while performing a quick switch-off operation by reducing the thickness of the liquid crystal layer 403, and a tangential electric field may be actively formed in the liquid crystal layer 403. The high-frequency device 400 may further include side electrodes (e.g., side electrodes 205 and 206 in FIG. 7) in order to actively form a tangential electric field (e.g., to apply a control voltage in a switch-off operation). When the side electrodes are not included, the control voltage may be applied through some of the segments 411 and 421, which constitute the signal electrode 401 (or the ground electrode 402). In one embodiment, the high-frequency device 400 may include distribution electrodes (e.g., the distribution electrodes 307a, 307b, and 307c in FIG. 13) for distributing current to respective segments 411 and 421, which constitute the signal electrode 401 and the ground electrode 402, which may form the input or output port of the high-frequency device 400. In a certain embodiment, the signal electrode 401 and/or the ground electrode 402 may be provided as part of a transmission line (e.g., a microstrip line).

In another embodiment, the high-frequency device 400 may be utilized as a phase shifter on a high-frequency signal transmission line. For example, the high-frequency device 400 may shift the phase of a high-frequency signal flowing through the high-frequency device 400 when a control voltage is applied thereto. As the control voltage is applied, the alignment of the liquid crystals in the liquid crystal layer 403 may be changed, and the dielectric constant of the liquid crystal layer 403 may be changed according to the change in the alignment of the liquid crystals, so that the phase of the high-frequency signal transmitted through the high-frequency device 400 may be shifted.

In a high-frequency device according to various embodiments of the present disclosure, the switch-on/off time using the liquid crystal layer may be calculated by the following equations.

$$t_{on} \propto \frac{\gamma_{LC} h_{LC}^2}{\Delta\varepsilon_r (V_b^2 - V_{th}^2)} \quad \text{Equation 1}$$

$$t_{off} \propto \frac{\gamma_{LC} h_{LC}^2}{\Delta\varepsilon_r V_{th}^2} \quad \text{Equation 2}$$

Here, "$T_{on}$" represents the switch-on time of the liquid crystal layer, "$T_{off}$" represents the switch-off time of the liquid crystal layer, "$\gamma_{LC}$" represents the viscosity of the liquid crystal mixture, "$h_{LC}$" represents the thickness of the liquid crystal layer, "$\Delta\varepsilon_r$" represents a difference between dielectric constants according to vertical and horizontal alignments of the liquid crystal mixture at a low frequency, "$V_{th}$" is a parameter (measured by a unit of volt) that defines an interaction energy between a liquid crystal layer and an alignment layer, and "$V_b$" represents the control voltage applied to the liquid crystal layer.

As described above, the operation time may be actively controlled by increasing the control voltage $V_b$ in the switch-on operation. In the switch-off operation, it can be seen that the operating time is determined by parameters that define the liquid crystal mixture, the thickness characteristics of the alignment layer and the liquid crystal layer, and the like. Equations 1 and 2 above express the relaxation of the liquid crystal layer in the state where the alignment layer is present.

The effect of the alignment layer in the high-frequency device 100 illustrated in FIG. 2 and the formation of a tangential electric field in the high-frequency device 200a illustrated in FIG. 6 may be expressed by the following equations.

$$k_{LC} = \frac{\omega}{c_p} \quad \text{Equation 3}$$

$$c_p = \frac{c_o}{\sqrt{\varepsilon_{\mathit{eff}}}} \quad \text{Equation 4}$$

$$\Delta\phi_{max} = (k_{LC}(\varepsilon_\parallel) - k_{LC}(\varepsilon_\perp))l_{ms} \quad \text{Equation 5}$$

Here, "$k_{LC}$" represents a wave number in a transmission line, "$c_p$" represents a phase speed in the transmission line, "$\Delta\Phi_{max}$" represents a maximum phase difference obtained in a line segment having a length $l_{ms}$, "$\varepsilon_{\mathit{eff}}$" represents an effective dielectric constant of the transmission line as a function of the dielectric constant of a liquid crystal mixture, "$\varepsilon_\parallel$" represents the effective dielectric constant of the transmission line when the control field is applied between the electrodes of the transmission line, and "$\varepsilon_\perp$" represents the effective dielectric constant of the transmission line when molecules (e.g., liquid crystals) are aligned substantially in parallel with the electrodes of the transmission line.

As described above, the high-frequency device according to various embodiments of the present disclosure may be utilized as a phase shifter and/or as a switch for a high-frequency signal on a microstrip transmission line. For example, the high-frequency devices 100 and 200a illustrated in FIG. 2 and/or FIG. 6 may be a part of a microstrip (e.g., an asymmetrical strip) transmission line by providing a substrate configured with the liquid crystal layers 103 and 203 or the dielectric layer 104, as well as by forming electrodes (e.g., the signal electrodes 101 and 201 and/or the ground electrodes 102 and 202) of strips. For example, a high-frequency device according to various embodiments of the present disclosure may be integrated into a printed circuit board, or may be easily integrated into individual electronic components or devices (e.g., chips).

Figure 17:
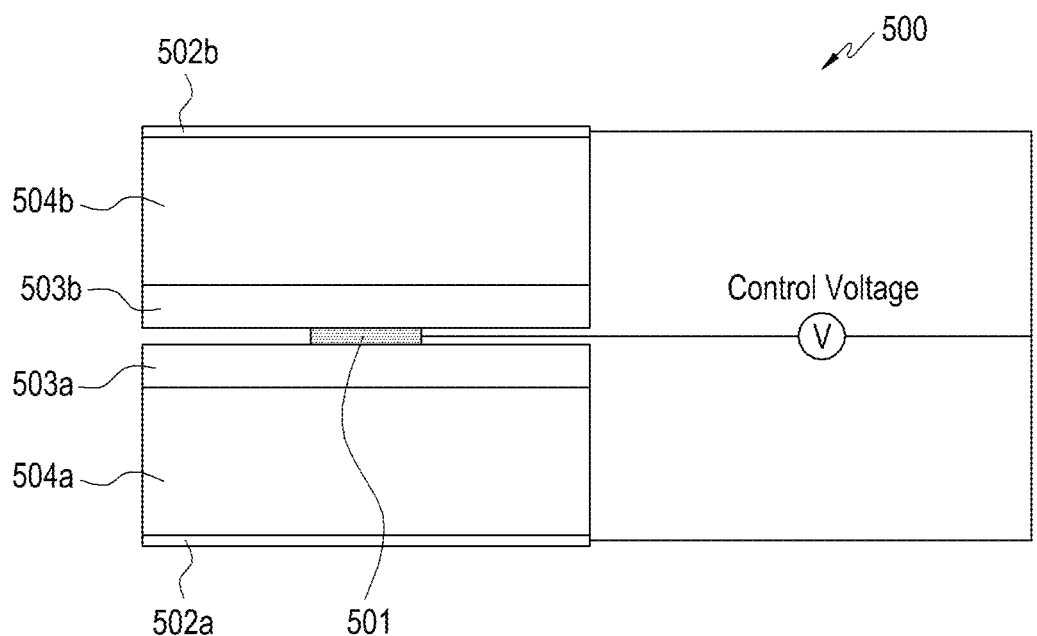
FIG. 17 is a configuration view illustrating an application example of the high-frequency device according to one of various embodiments of the present disclosure.

FIG. 17 is a configuration view illustrating an application example of the high-frequency device according to one of various embodiments of the present disclosure.

Referring to FIG. 17, the high-frequency device 500 according to various embodiments of the present disclosure may include first and second liquid crystal layers 503a and 503b, first and second dielectric layers 504a and 504b, and first and second ground electrodes 502a and 502b, which are disposed to be symmetrical to each other with respect to the signal electrode 501. For example, the first and second ground electrodes 502a and 502b may be disposed to be symmetrical to each other with respect to the signal electrode 501 so as to form a symmetric microstrip transmission line, the first and second liquid crystal layers 503a and 503b may be disposed on the opposite sides (e.g., the upper and lower sides) of the signal electrode 501 to be symmetrical to each other, and the first and second dielectric layers 504a and 504b may be disposed symmetrically between the first liquid crystal layer 503a and the first ground electrode 502a and between the second liquid crystal layer 503b and the second ground electrode 502b, respectively.

The high-frequency device 500 may perform a switch-on operation when the signal electrode 501 and the first and second ground electrodes 502a and 502b are connected to the control voltage source V and a control voltage is applied to the high-frequency device 500. The high-frequency device 500 may perform a switch-off operation while the applied control voltage is cut off, and in the switch-off operation, the first and second dielectric layers 504a and 504b may contribute to reducing the thickness of the first and second liquid crystal layers 503a and 503b while suppressing and relaxing the loss. The reduction in the thickness of the first and second liquid crystal layers 503a and 503b may contribute to reducing the operating time in a passive switch-off operation.

Figure 18:
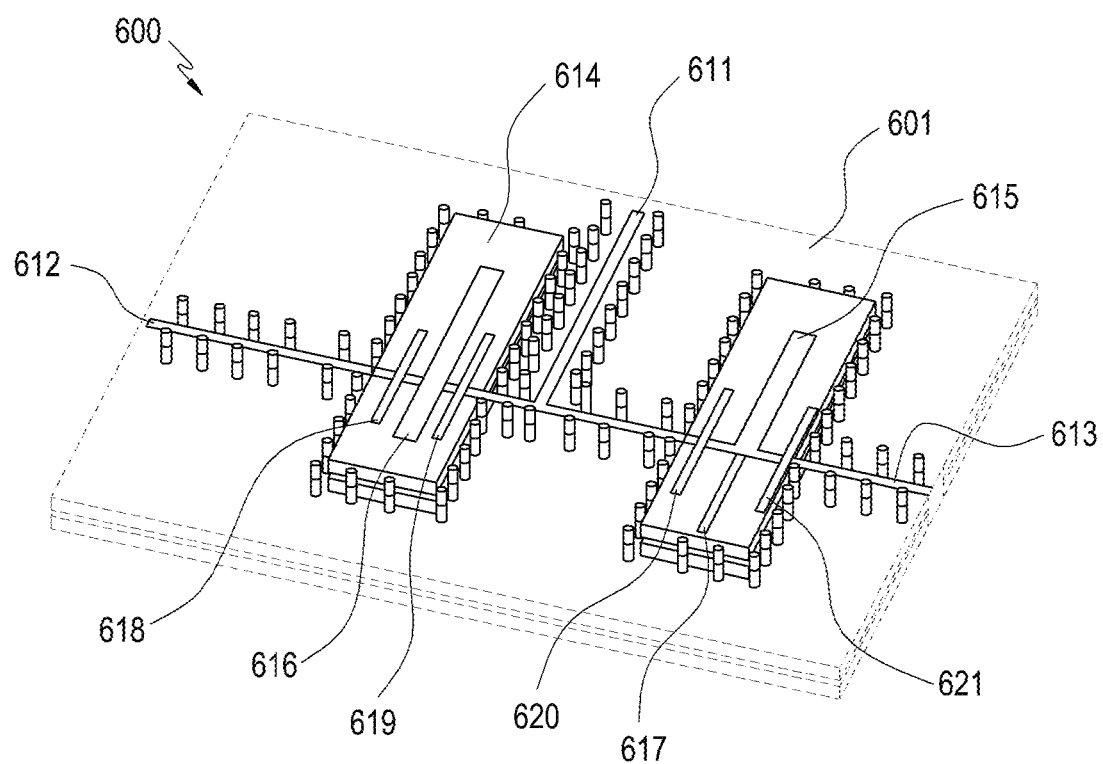
FIG. 18 is a configuration view illustrating a high-frequency switch structure including a liquid crystal based high-frequency device according to various embodiments of the present disclosure.

FIG. 18 is a block diagram illustrating a high-frequency switch 600 including liquid crystal-based high-frequency devices 614 and 615 according to various embodiments of the present disclosure.

The high-frequency switch 600 is implemented on a printed circuit board 601, and the liquid crystal layer and/or the dielectric layer of the high-frequency devices 614 and 615 (e.g., the high-frequency device 300 of FIG. 13) may form a part of the printed circuit board 601. The high-frequency switch 600 may be a switch including one input port 611 and a plurality of (e.g., two) output ports 612 and 613, and may include a plurality of high-frequency devices 614 and 615, e.g., by a number corresponding to the number of output ports 612 and 613. The input port 611 and the output ports 612 and 613 may be connected to each other through the microstrip transmission line(s). According to one embodiment, among the high-frequency devices, a first high-frequency device 614 may be disposed on the microstrip transmission line between the input port 611 and a first output port 612 among the output ports. Among the high-frequency devices, a second high-frequency device 615 may be disposed on the microstrip transmission line between the input port 611 and a second output port 613 among the output ports. In a certain embodiment, the high-frequency switch 600 may further include line stubs 616 and 617, which are a part of the microstrip transmission line and respectively extend from the high-frequency devices 614 and 615 and/or alignment stubs 618 and 619; 620 and 621, which are respectively disposed on both sides of each of the high-frequency devices 614 and 615. The size of each of the high-frequency devices 614 and 615 is set such that when a first control voltage is applied to the microstrip transmission line at a given frequency, the electrical length of the first high-frequency device 614 is set to $L_1 = \lambda_{\varepsilon1}/4$, and when a second control voltage is applied to the microstrip transmission line at a given frequency, the electrical length of the second high-frequency device 615 may be set to $L_2 = \lambda_{\varepsilon2}/4$. For example, the first high-frequency device 614 and the second high-frequency device 615 may have different electrical lengths.

According to one embodiment, when the first control voltage is applied, the liquid crystal layers (e.g., the liquid crystal layer 303 in FIG. 13) of the first and second high-frequency devices 614 and 615 may have a dielectric constant of ε1, and the first high-frequency device 614 may have an electrical length of $\lambda_{\epsilon1}/4$. In this case, when a high-frequency signal is received through the input port 611, the first high-frequency device 614 may function as a quarter-wavelength converter which blocks the high-frequency signal from being transmitted to the first output port 612. That is, in this state, the first high-frequency device 614 is in the switch-on state. At the same time, when the dielectric constant is ε1, the electrical length of the second high-frequency device 615 is not $\lambda_{\epsilon1}/4$, and as a result, a high-frequency signal received through the input port 611 may flow to the second output port 613 via the second high-frequency device 615 having little loss. That is, in this state, the second high-frequency device 615 is in the switch-off state.

Figure 19:
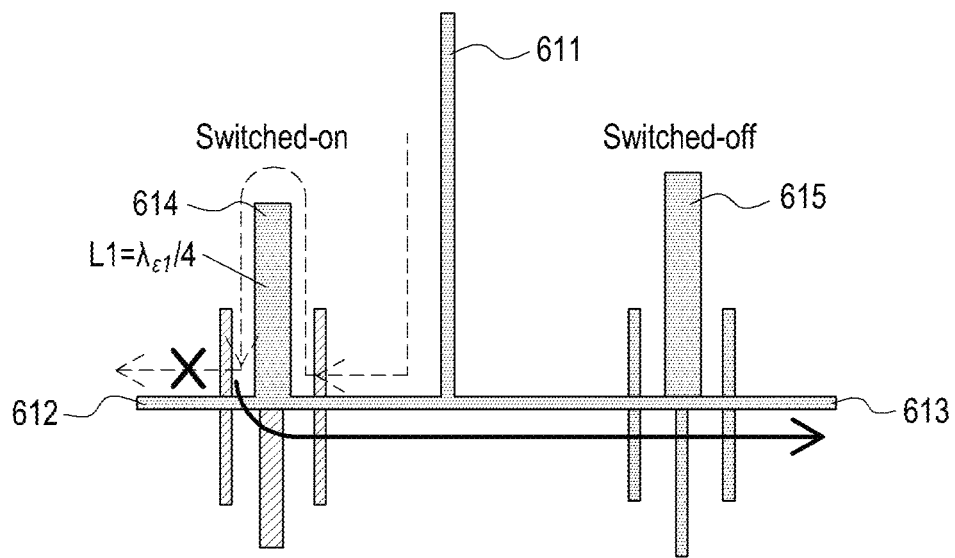
FIG. 19 is a view illustrating signal flow in a high-frequency switch according to various embodiments of the present disclosure in the state in which a first control voltage is applied thereto.
Figure 20:
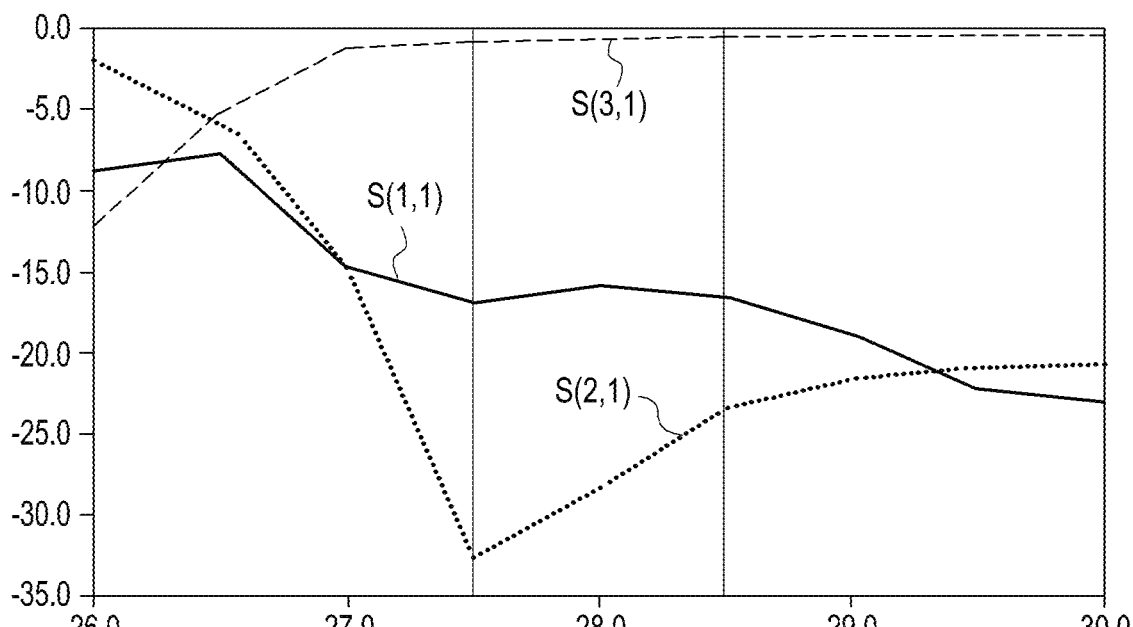
FIG. 20 is a graph illustrating an S-parameter of the high-frequency switch according to various embodiments of the present disclosure in the state in which a first control voltage is applied thereto.

FIG. 19 is a view illustrating a signal flow of a high-frequency switch 600 according to various embodiments of the present disclosure in the state in which a first control voltage is applied thereto. FIG. 20 is a graph illustrating an S-parameter of the high-frequency switch 600 according to various embodiments of the present disclosure in the state in which a first control voltage is applied thereto.

Further referring to FIGS. 19 and 20, it can be seen that in the state in which the first control voltage is applied to the high-frequency switch 600, almost all of the power received through the input port 611 is delivered to the second output port 613. For example, when a first control voltage of 0 V is applied at a frequency of 28 GHz, the reflection coefficient S(1, 1) of the input port 611 may be −16 dB, and the transmission coefficient S(2, 1) from the input port 611 to the first output port 612 may be −28.5 dB while the transmission coefficient S(3, 1) from the input port 611 to the second output port 613 may be −0.5 dB. For example, in the state in which the first control voltage is applied, signal transmission from the input port 611 to the second output port 613 may be made in the state in which there is little loss, and as a result, in the state in which the first control voltage is applied, the high-frequency switch 600 may transmit almost all of the power to the second output port 613.

According to another embodiment, when the second control voltage is applied, the liquid crystal layers (e.g., the liquid crystal layer 303 in FIG. 13) of the first and second high-frequency devices 614 and 615 may have a dielectric constant of ε2, and the second high-frequency device 615 may have an electrical length of $\lambda_{\epsilon2}/4$. In this case, when a high-frequency signal is received through the input port 611, the second high-frequency device 615 may function as a quarter-wavelength converter which blocks the high-frequency signal from being transmitted to the second output port 613. That is, in this state, the second high-frequency device 615 is in the switch-on state. At the same time, when the dielectric constant is ε2, the electrical length of the first high-frequency device 614 is not $\lambda_{\epsilon2}/4$, and as a result, a high-frequency signal received through the input port 611 may flow to the first output port 612 via the first high-frequency device 611 having little loss. That is, in this state, the first high-frequency device 614 is in the switch-off state.

Figure 21:
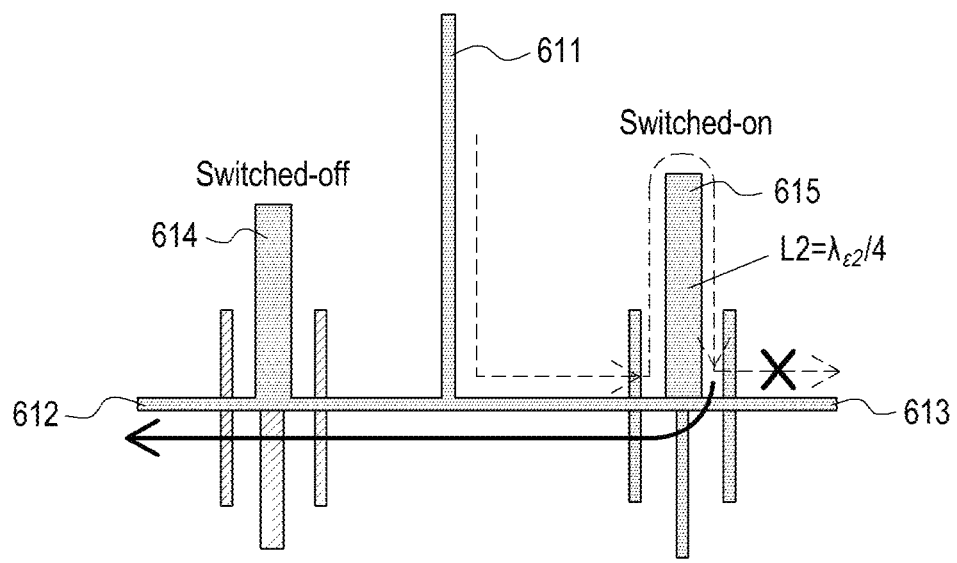
FIG. 21 is a view illustrating a signal flow of a high-frequency switch according to various embodiments of the present disclosure in the state in which a second control voltage is applied.
Figure 22:
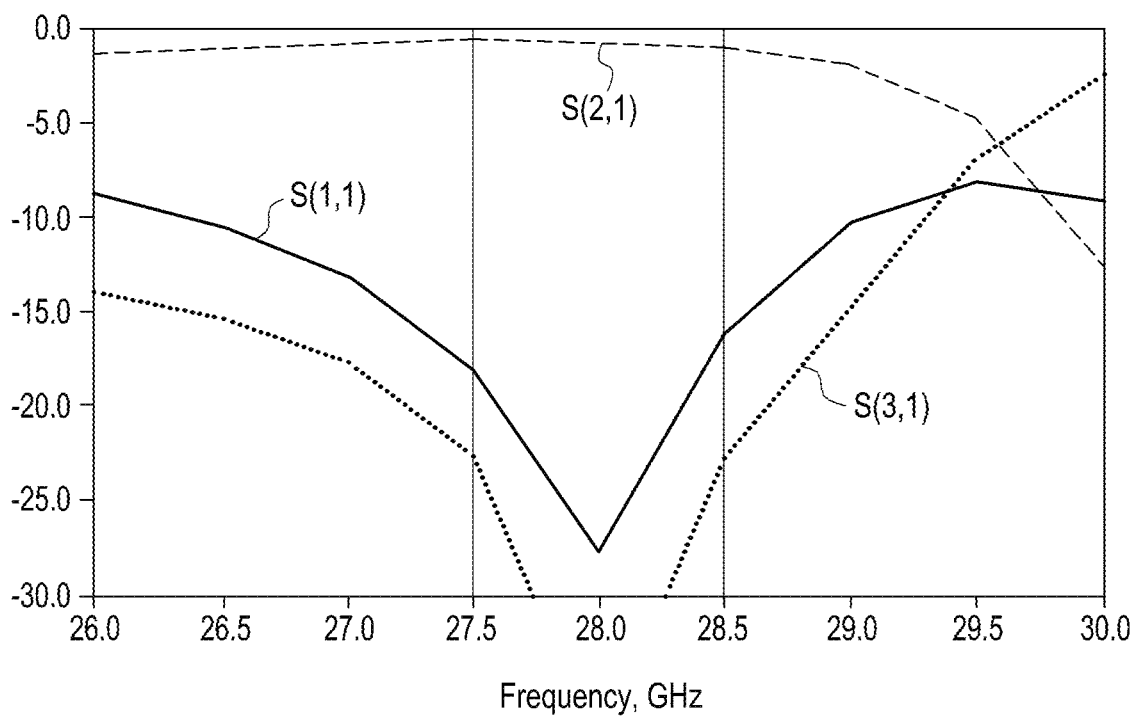
FIG. 22 is a graph illustrating an S-parameter of a high-frequency switch according to various embodiments of the present disclosure in the state in which a first control voltage is applied thereto.

FIG. 21 is a view illustrating signal flow in a high-frequency switch 600 according to various embodiments of the present disclosure in the state in which a second control voltage is applied thereto. FIG. 22 is a graph illustrating an S-parameter of the high-frequency switch 600 according to various embodiments of the present disclosure in the state in which a first control voltage is applied thereto.

Further referring to FIGS. 21 and 22, it can be seen that in the state in which the second control voltage is applied to the high-frequency switch 600, almost all of the power received through the input port 611 is delivered to the first output port 612. For example, when a second control voltage of 10 V is applied at a frequency of 28 GHz, the reflection coefficient S(1, 1) of the input port 611 may be −28 dB, and the transmission coefficient S(3, 1) from the input port 611 to the second output port 613 may be −30 dB while the transmission coefficient S(2, 1) from the input port 611 to the first output port 612 may be −0.8 dB. For example, in the state in which the second control voltage is applied, signal transmission from the input port 611 to the first output port 612 may be made in the state in which there is little loss, and as a result, in the state in which the second control voltage is applied, the high-frequency switch 600 may transmit almost all of the power to the first output port 612.

As described above, a high-frequency switch (for example, the high-frequency switch 600 of FIG. 18) capable of performing a low-loss, high-speed switching operation may be realized by combining high-frequency devices according to various embodiments of the present disclosure. Further, since such a high-frequency switch is controlled only by a control voltage (e.g., a direct current voltage value) applied to the high-frequency device, the power and control circuit can be simplified. The above-described structures of high-frequency switches are given to describe the constitution principles using the high-frequency devices according to various embodiments of the present disclosure, and the present disclosure is not limited thereto. The number and arrangement of the high-frequency devices may be variously implemented according to an installation environment, the usage, and the requirements for the high-frequency switch. In addition, although a specific example of the present disclosure refers to an example in which the high-frequency switch operates in a reception mode, the high-frequency switch according to various embodiments of the present disclosure may also operate in a transmission mode.

According to various embodiments, in the above-described high-frequency devices, a transmission line (for example, a microstrip line) including the above-described high-frequency devices, a phase shifter using the high-frequency devices, and/or a high-frequency switch may be utilized in electronic devices that require the control of a high-frequency signal, such as a millimeter-wave (mm-wave) mobile communication network, such as 5G communication or WiGig, various sensors, a WiFi network for wireless power transmission including long distance power transmission, and a smart house system.

According to one embodiment, the high-frequency switch including the above-mentioned high-frequency devices may efficiently perform switching between channels in a multiple channel device, reception-transmission (RX-TX) switching, switching between operating modes of an antenna (e.g., switching between a broadband radiation mode and a directional radiation mode in broadband scanning), deflection, and radial direction switching.

According to another embodiment, a high-frequency phase shifter using the above-described high-frequency devices may be efficiently utilized as an antenna for beam scanning and/or an antenna for manipulation using an antenna near field including an operation for focusing a field on a specific spatial region.

As described above, a high-frequency device according to various embodiments of the present disclosure and/or a high-frequency switch including the same may include: a signal electrode; a first ground electrode arranged in parallel with the signal electrode; a first liquid crystal layer disposed between the signal electrode and the first ground electrode; and a first dielectric layer disposed between the first liquid crystal layer and the first ground electrode, and/or between the signal electrode and the first liquid crystal layer.

The first dielectric layer may have a dielectric constant that is larger than the dielectric constant of the first liquid crystal layer.

According to various embodiments, the signal electrode may be configured with a combination of first segments that extend in a first direction while being arranged in a second direction perpendicular to the first direction, the first ground electrode may be configured with a combination of second segments that extend in the first direction while being arranged in the second direction, the high-frequency device may further include first distribution electrodes near both ends of each of the signal electrode and the first ground electrode, the first distribution electrodes may each have a solid plate shape having a width that covers at least some of the first and second segments, and may be separated from each of the signal electrode and the first ground electrode by an insulating layer, a distance between the first and second segments and the first distribution electrodes, a dimension of each of the first and second segments and the first distribution electrodes, and a material that forms the insulating layer may be selected such that the first segments form capacitive coupling according to an applied control voltage, thereby forming a tangential electric field in the second direction, and neighboring first distribution electrodes may be disposed to be spaced apart from each other.

According to various embodiments, the high-frequency device disclosed above may further include additional electrodes that are respectively disposed at the ends of the high-frequency device in the second direction, and the additional electrodes may be arranged in parallel with each other while being arranged to be perpendicular to planes on which the signal electrode and the first ground electrode are disposed, respectively, and may form a tangential electric field in the first liquid crystal layer as a control voltage is applied thereto.

According to various embodiments, among the first segments, segments disposed at least both ends of the first segments in the second direction may not be covered with the first distribution electrodes, but may be connected to a control voltage source through filter circuits.

According to various embodiments, the high-frequency device described above may further include at least one second distribution electrode disposed in a region between respective ends of the signal electrode and the first ground electrode.

According to various embodiments, at least some of the segments that constitute the signal electrode and the first ground electrode may form a tangential electric field in the first liquid crystal layer as a respective control voltage is applied thereto.

According to various embodiments, the high-frequency device described above may further include: a second ground electrode disposed symmetrically to the first ground electrode based on the signal electrode; a second liquid crystal layer disposed between the signal electrode and the second ground electrode; and a second dielectric layer disposed on at least one of the second liquid crystal layer and the second ground electrode, between the signal electrode and the second liquid crystal layer. The second dielectric layer may have a dielectric constant that is larger than the dielectric constant of the second liquid crystal layer.

According to various embodiments, the second ground electrode may be configured with a combination of a plurality of segments.

According to various embodiments, the first dielectric layer may include an oxide-based ceramic having a dielectric constant of 100 or more, or an organic material mixture filled with a ceramic.

According to various embodiments of the present disclosure, a high-frequency device and/or a high-frequency switch including the high-frequency device may include: a signal electrode configured with a combination of a plurality of first segments; a first ground electrode configured with a combination of a plurality of second segments and arranged in parallel with the signal electrode; a first liquid crystal layer disposed between the signal electrode and the first ground electrode; and one or more first distribution electrodes near both ends of each of the signal electrode and the first ground electrode. The first distribution electrodes may each have a solid plate shape having a width that covers at least some segments of the first and second segments, and may be separated from each of the signal electrode and the first ground electrode by an insulating layer.

The distance between the first and second segments and the first distribution electrodes, the dimension of each of the first and second segments and the first distribution electrodes, and the material that forms the insulating layer may be selected such that the first segments form capacitive coupling in accordance with an applied control voltage, thereby forming a tangential electric field along the arrangement direction of the first segments. Neighboring first distribution electrodes may be disposed to be spaced apart from each other.

According to various embodiments, the high-frequency device disclosed above may further include additional electrodes that are respectively disposed at the ends of the high-frequency device in the arrangement direction of the first segments, and the additional electrodes may be arranged in parallel with each other while being arranged to be perpendicular to planes on which the signal electrode and the first ground electrode are disposed, respectively, and may form a tangential electric field in the first liquid crystal layer as a control voltage is applied thereto.

According to various embodiments, among the first segments, segments disposed at least both ends of the first segments in the arrangement direction of the first segments may not be covered with the first distribution electrodes, but may be connected to a control voltage source through filter circuits.

According to various embodiments, the high-frequency device described above may further include at least one second distribution electrode disposed in a region between respective ends of the signal electrode and the first ground electrode.

According to various embodiments, the high-frequency device may further include a second ground electrode disposed symmetrically to the first ground electrode based on the signal electrode, and configured with a plurality of third segments, and a second liquid crystal layer disposed between the signal electrode and the first ground electrode.

According to various embodiments, the high-frequency device described above may further include a first dielectric material disposed between the first liquid crystal layer and the first ground electrode and/or between the signal electrode and the first liquid crystal layer.

The dielectric layer may have a dielectric constant that is larger than the dielectric constant of the second liquid crystal layer.

According to various embodiments, the first distribution electrodes may have a width that covers ends of the first and second segments that correspond thereto, respectively.

According to various embodiments, the high-frequency switch described above may further include an input port, and a plurality of output ports, each of which is connected to the input port through a microstrip transmission line.

The high-frequency device may be disposed in an area between the output ports and the input port.

According to various embodiments, among the high-frequency devices, a first high-frequency device may be disposed between a first output port of the output ports and the input port, and may be applied with a first signal voltage to form a quarter wavelength converter of a first electric length, and among the high-frequency devices, a second high-frequency device may be disposed between a second output port of the output ports and the input port, and may be applied with a second signal voltage to form a quarter wavelength converter of a second electric length.

According to various embodiments, when the first signal voltage is applied, the first high-frequency device may be in a switch-on state and the second high-frequency device may be in a switch-off state, and when the second signal voltage is applied, the first high-frequency device may be in the switch-off state and the second high-frequency device may be in the switch-on state.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A high-frequency device comprising:
    a signal electrode;
    a first ground electrode arranged in parallel with the signal electrode;
    a first liquid crystal layer disposed between the signal electrode and the first ground electrode; and
    a first dielectric layer disposed on at least one position of a first position and a second position, wherein the first position is a position between the first liquid crystal layer and the first ground electrode and the second position is a position between the signal electrode and the first liquid crystal layer, while being in contact with the first liquid crystal layer,
    wherein the first dielectric layer has a dielectric constant that is larger than a dielectric constant of the first liquid crystal layer.

2. The high-frequency device of claim 1, wherein the signal electrode is configured with a combination of first segments that extend in a first direction while being arranged in a second direction perpendicular to the first direction,
    the first ground electrode is configured with a combination of second segments that extend in the first direction while being arranged in the second direction,
    the high-frequency device further comprises first distribution electrodes near both ends of each of the signal electrode and the first ground electrode,
    the first distribution electrodes each have a solid plate shape having a width that covers at least some segments of the first and second segments, and are separated from each of the signal electrode and the first ground electrode by an insulating layer,
    a distance between the first and second segments and the first distribution electrodes, a dimension of each of the first and second segments and the first distribution electrodes, and a material that forms the insulating layer are selected such that the first segments form capacitive coupling according to an applied control voltage, thereby forming a tangential electric field in the second direction, and
    neighboring first distribution electrodes are spaced apart from each other.

3. The high-frequency device of claim 2, further comprising additional electrodes that are respectively disposed at ends of the high-frequency device in the second direction,
    wherein the additional electrodes are arranged in parallel with each other while being arranged to be perpendicular to planes on which the signal electrode and the first ground electrode are disposed, respectively, and form a tangential electric field in the first liquid crystal layer as a control voltage is applied thereto.

4. The high-frequency device of claim 2, wherein among the first segments, segments are disposed at least at both ends of the first segments in the second direction and are not covered with the first distribution electrodes, and are connected to a control voltage source through filter circuits.

5. The high-frequency device of claim 2, further comprising at least one second distribution electrode disposed in a region between respective ends of the signal electrode and the first ground electrode.

6. The high-frequency device of claim 2, wherein at least some of the segments that constitute the signal electrode and the first ground electrode form a tangential electric field in the first liquid crystal layer when a respective control voltage is applied thereto.

7. The high-frequency device of claim 1, further comprising:
    a second ground electrode disposed symmetrically to the first ground electrode based on the signal electrode;
    a second liquid crystal layer disposed between the signal electrode and the second ground electrode; and
    a second dielectric layer disposed on at least one of between the second liquid crystal layer and the second ground electrode, or between the signal electrode and the second liquid crystal layer,
    wherein the second dielectric layer has a dielectric constant that is larger than a dielectric constant of the second liquid crystal layer.

8. The high-frequency device of claim 7, wherein the second ground electrode is configured with a combination of a plurality of segments.

9. The high-frequency device of claim 1, wherein the first dielectric layer comprises an oxide-based ceramic having a dielectric constant of 100 or more, or an organic material mixture filled with a ceramic.

10. A high-frequency device comprising:
    a signal electrode configured with a combination of a plurality of first segments;
    a first ground electrode configured with a combination of a plurality of second segments and arranged in parallel with the signal electrode;
    a first liquid crystal layer disposed between the signal electrode and the first ground electrode; and
    one or more first distribution electrodes near both ends of each of the signal electrode and the first ground electrode,
    wherein the first distribution electrodes each have a solid plate shape having a width that covers at least some segments of the first and second segments, and separated from each of the signal electrode and the first ground electrode by an insulating layer,
    a distance between the first and second segments and the first distribution electrodes, a dimension of each of the first and second segments and the first distribution electrodes, and a material that forms the insulating layer are selected such that the first segments form capacitive coupling according to a control voltage applied thereto, thereby forming a tangential electric field along an arrangement direction of the first segments, and neighboring first distribution electrodes are disposed to be spaced apart from each other.

11. The high-frequency device of claim 10, further comprising additional electrodes that are respectively disposed at ends of the high-frequency device in the arrangement direction of the first segments, wherein the additional electrodes are arranged in parallel with each other while being arranged to be perpendicular to planes on which the signal electrode and the first ground electrode are disposed, respectively, and form a tangential electric field in the first liquid crystal layer as a control voltage is applied thereto.

12. The high-frequency device of claim 10, wherein among the first segments, segments are disposed at least at both ends of the first segments in the arrangement direction of the first segments and are not covered with the first distribution electrodes, and are connected to a control voltage source through filter circuits.

13. The high-frequency device of claim 10, further comprising at least one second distribution electrode disposed in a region between respective ends of the signal electrode and the first ground electrode.

14. The high-frequency device of claim 10, further comprising:

a second ground electrode disposed symmetrically to the first ground electrode based on the signal electrode, and configured with a plurality of third segments; and a second liquid crystal layer disposed between the signal electrode and the first ground electrode.

15. The high-frequency device of claim 14, further comprising a dielectric layer disposed between at least one of the second liquid crystal layer and the second ground electrode, or between the signal electrode and the second liquid crystal layer, wherein the dielectric layer has a dielectric constant that is larger than a dielectric constant of the second liquid crystal layer.

16. The high-frequency device of claim 10, wherein the first distribution electrodes have a width that covers ends of the first and second segments that correspond thereto, respectively.

17. A high-frequency switch comprising one or more high-frequency devices, wherein the one or more high frequency devices comprise:

a signal electrode;

a first ground electrode arranged in parallel with the signal electrode;

a first liquid crystal layer disposed between the signal electrode and the first ground electrode; and a first dielectric layer disposed on at least one of a first position and a second position, wherein the first position is a position between the first liquid crystal layer and the first ground electrode and the second position is a position between the signal electrode and the first liquid crystal layer, while being in contact with the first liquid crystal layer, wherein the first dielectric layer has a dielectric constant that is larger than a dielectric constant of the first liquid crystal layer.

18. The high-frequency switch of claim 17, further comprising:

an input port; and a plurality of output ports, each of which is connected to the input port through a microstrip transmission line, wherein the one or more high-frequency devices is disposed in an area between the output ports and the input port.

19. The high-frequency switch of claim 18, wherein among the one or more high-frequency devices, a first high-frequency device is disposed between a first output port of the output ports and the input port, and is applied with a first signal voltage to form a quarter wavelength converter of a first electric length, and among the one or more high-frequency devices, a second high-frequency device is disposed between a second output port of the output ports and the input port, and is applied with a second signal voltage to form a quarter wavelength converter of a second electric length.

20. The high-frequency switch of claim 19, wherein when the first signal voltage is applied, the first high-frequency device is in a switch-on state and the second high-frequency device is in a switch-off state, and when the second signal voltage is applied, the first high-frequency device is in the switch-off state and the second high-frequency device is in the switch-on state.

* * * * *